United States Patent
Grundy et al.

(10) Patent No.: US 8,244,993 B2
(45) Date of Patent: Aug. 14, 2012

(54) MEMORY CHAIN

(75) Inventors: Kevin P. Grundy, Fremont, CA (US);
Para K. Segaram, Cupertino, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/165,206

(22) Filed: Jun. 21, 2011

(65) Prior Publication Data

US 2011/0252164 A1    Oct. 13, 2011

Related U.S. Application Data

(63) Continuation of application No. 11/933,445, filed on Nov. 1, 2007, now Pat. No. 7,966,443.

(51) Int. Cl.
    *G06F 12/00* (2006.01)
(52) U.S. Cl. .................. 711/154; 711/5; 711/E12.001
(58) Field of Classification Search .............. 711/154, 711/110, E12.001
    See application file for complete search history.

(56) References Cited

U.S. PATENT DOCUMENTS

| | | | |
|---|---|---|---|
| 4,943,946 A | 7/1990 | Brent | |
| 5,715,274 A | 2/1998 | Rostocker et al. | |
| 5,860,080 A | 1/1999 | James | |
| 5,945,886 A | 8/1999 | Millar | |
| 6,125,419 A | 9/2000 | Umemura et al. | |
| 6,304,450 B1 | 10/2001 | Dibene, II et al. | |
| 6,833,984 B1 | 12/2004 | Belgacem | |
| 7,707,321 B2 | 4/2010 | Lee et al. | |
| 2002/0067915 A1 | 6/2002 | Shida et al. | |
| 2002/0083255 A1 | 6/2002 | Greff et al. | |
| 2003/0174075 A1 | 9/2003 | Iwata | |
| 2004/0030803 A1 | 2/2004 | Eatherton et al. | |
| 2006/0012713 A1* | 1/2006 | Kim et al. | 348/552 |
| 2009/0327565 A1* | 12/2009 | Ware | 710/305 |

OTHER PUBLICATIONS

IEEE Computer Society, IEEE Standard for High-Bandwidth Memory Interface Based on Scalable Coherent Interface (SCI) Signaling Technology (Ram Link), IEEE Std. 1596.4 Mar. 1996.
Przybylski, Stephen A., "New DRAM Technologies", MicroDesign Resources, 1994, pp. 204-215.
Poulton, John, "Signaling in High Performance Memory Systems", ISSCC 1999, pp. 1-59.
Serial Network SDRAM presentation, ENEE 759H, Spring 2003, pp. 1-30.

* cited by examiner

*Primary Examiner* — Pierre-Michel Bataille
(74) *Attorney, Agent, or Firm* — Myers Bigel Sibley & Sajovec, P.A.

(57) ABSTRACT

A memory system having a plurality of memory devices and a memory controller. The memory devices are coupled to one another in a chain. The memory controller is coupled to the chain and configured to output a memory access command that is received by each of the memory devices in the chain and that selects a set of two or more of the memory devices to be accessed.

8 Claims, 31 Drawing Sheets

PRIOR-ART

PRIOR-ART

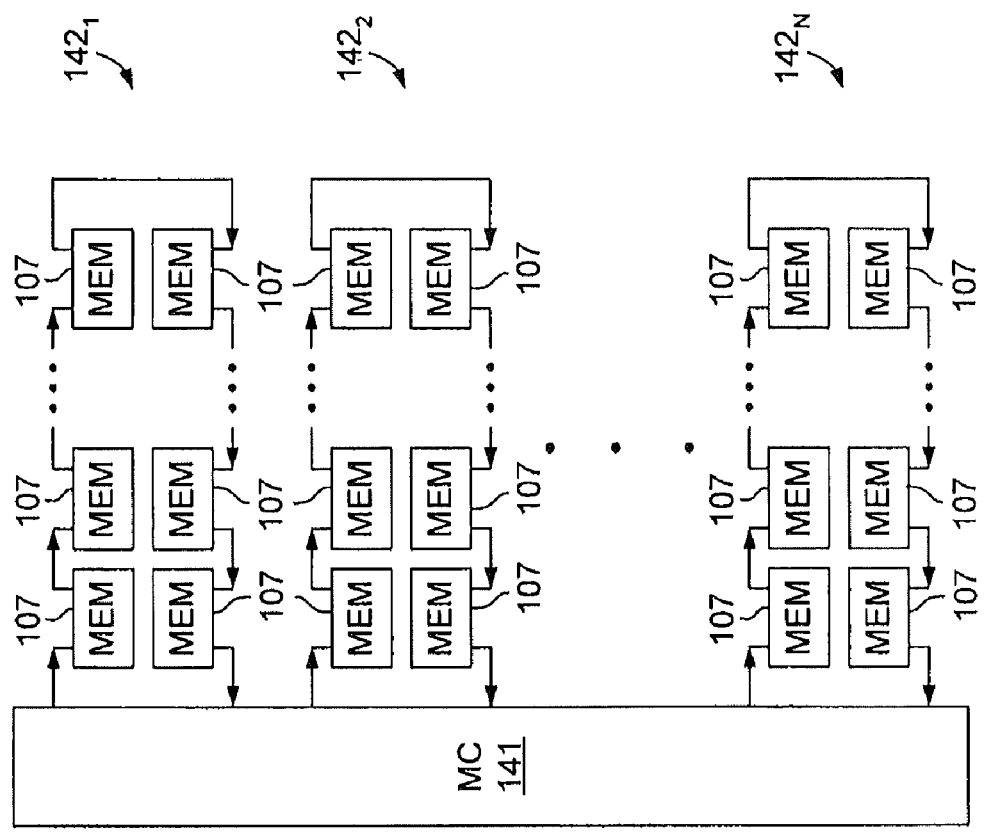

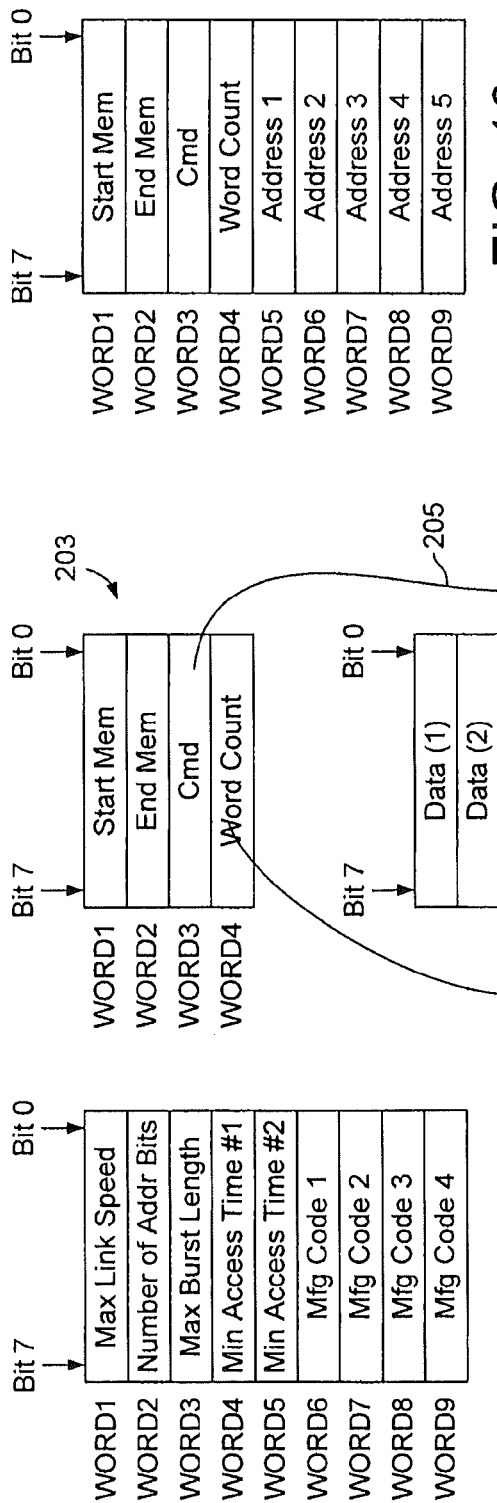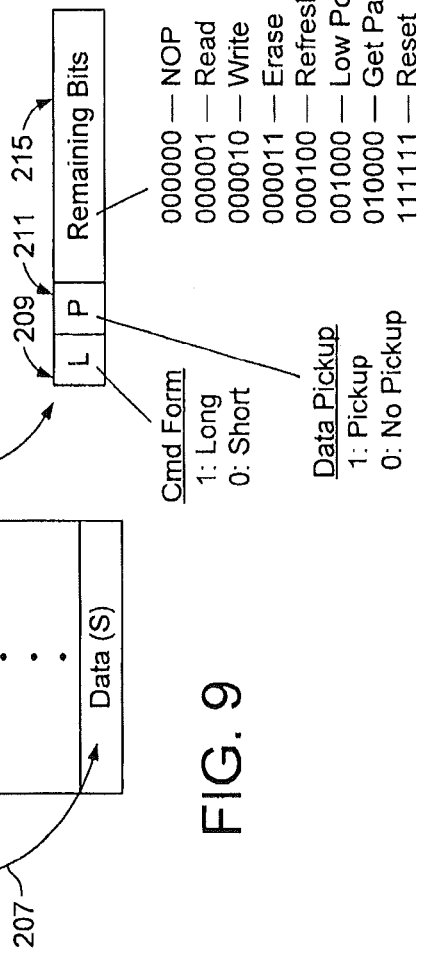

MEMORY CHAIN

CROSS-REFERENCE TO RELATED APPLICATIONS

The present application is a continuation of and claims priority from U.S. patent application Ser. No. 11/933,445, filed Nov. 1, 2007, issuing as U.S. Pat. No. 7,996,443 on Jun. 21, 2011, which claims priority from U.S. patent application Ser. No. 10/757,000 Filed Jan. 13, 2004, issuing as U.S. Pat. No. 7,308,524 on Dec. 11, 2007, which claims priority from U.S. Provisional Application No. 60/439,962 filed Jan. 13, 2003, U.S. Provisional Application No. 60/513,503 filed Oct. 21, 2003, and U.S. Provisional Application No. 60/517,646 filed Nov. 3, 2003, the disclosures of which are hereby incorporated herein by reference in their entireties.

FIELD OF THE INVENTION

The present invention relates generally to the field of data processing, and more particularly to high-speed memory systems and components of high-speed memory systems.

BACKGROUND

In response to inexorable demand for faster data throughput and larger storage capacity, memory systems have progressed from asynchronous to synchronous designs and more recently from multi-drop bus topologies to point-to-point systems. FIG. 1, for example illustrates a prior-art memory system 70 in which memory devices 73 are coupled to a memory controller 71 via a multi-drop bus 75. Although such systems offer the advantage of relatively simple and inexpensive expansion through connection of additional memory devices to the multi-drop bus, each additional device connection reduces signaling margin (i.e., due to increased bus capacitance and number of stubs) and therefore the peak transfer rate of the system. Thus, designers of multi-drop memory systems must usually compromise between system capacity and data throughput.

FIG. 2 illustrates a prior-art memory system 80 in which memory devices 83 are coupled to a memory controller 81 via respective point-to-point links 85. Such systems offer the advantage of extremely fast signaling rates, but at the cost of more complex and limited expandability. That is, as each new memory device is added to the system, additional input/output (I/O) pins and corresponding I/O circuitry are consumed within the memory controller so that, for a given generation of memory devices, the maximum storage capacity of the memory system is typically limited by the memory controller itself.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 4A-4E illustrate memory systems having multiple chains of memory devices;

FIG. 8 illustrates an exemplary device parameter packet transmitted by a memory device in response to a parameter query command from a memory controller;

FIGS. 9 and 10 illustrate formats of exemplary short-form and long-form command packets, respectively, that may be used to convey corresponding short-form and long-form commands in embodiments of the invention;

DETAILED DESCRIPTION

In the following description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments. As another example, circuits described or depicted as including metal oxide semiconductor (MOS) transistors may alternatively be implemented using bipolar technology or any other technology in which a signal-controlled current flow may be achieved. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., ' ') is also used to indicate an active low signal. The term "terminal" is used to mean a point of electrical connection. The term "exemplary" is used to express but an example, and not a preference or requirement.

Figure 1:
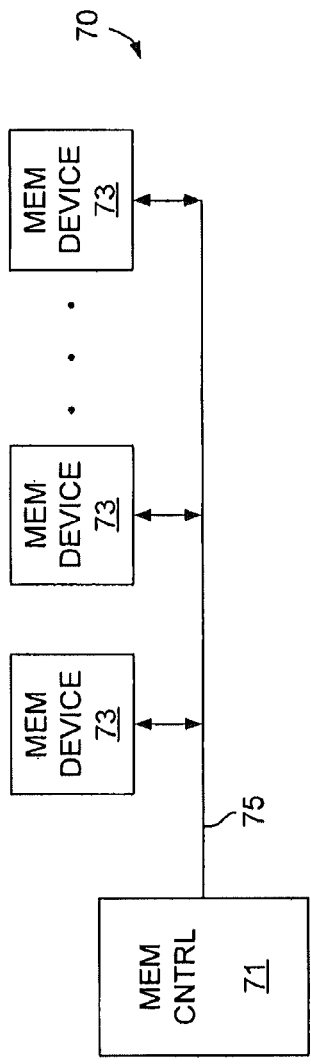
FIG. 1 illustrates a prior-art memory system in which memory devices are coupled to a memory controller via a multi-drop bus.
Figure 2:
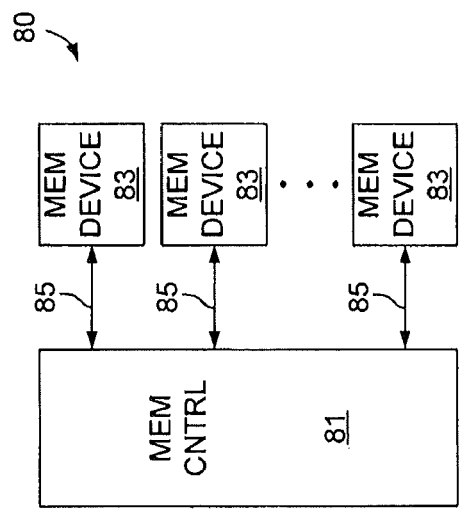
FIG. 2 illustrates a prior-art memory system in which memory devices are coupled to a memory controller via respective point-to-point links.

In memory systems according to embodiments of the invention, memory devices are chained to one another and to a memory controller via respective, high-speed, point-to-point signaling links. By this structure, each additional memory device is coupled to the system via a point-to-point link, thereby enabling high-integrity, high-speed signaling in combination with a system expansion path that does not compromise data throughput or consume additional pins on the memory controller. Commands and data received within a given memory device are retransmitted to a subsequent memory device in the chain after a brief storage in an interface register of the memory device. By this operation, commands and data propagate rapidly through the chain of memory devices so that the signaling latency introduced by the chained topology is kept low in proportion to the data access latency within the memory devices themselves. For example, in one embodiment, current mode output drivers are used to generate small-swing binary electrical signals that are output in response to both edges of a 6.4 Gigahertz clock signal, thus achieving a 12.8 gigahertz signaling rate per signal line. Each of the memory devices buffer incoming commands and data within the interface register for one half cycle of the clock signal, then retransmit the commands and data to the next memory device in the chain (or, in the case of the last memory device in the chain, to the memory controller). By this operation, and by keeping the point-to-point link between adjacent memory devices short enough to achieve a sub-clock cycle flight time, each additional memory device in the chain adds a signaling latency of approximately 150 picoseconds (or less in the case of link flight times less than a clock cycle). Thus, dozens of memory devices or more may be chained together with only a relatively small latency penalty. Moreover, in contrast to the prior-art memory systems described in reference to FIGS. 1 and 2, the chain of memory devices (referred to herein as the "memory chain") may be readily expanded, increasing capacity of the memory system without loss of signaling quality and without consuming additional I/O pins and circuitry on the memory controller.

In one embodiment, the memory chain self-initializes by assigning an ascending (or descending) sequence of device identifiers to the constituent memory devices of the chain. Also, device parameter information recorded within the memory devices during manufacture (or system production) is queried by the memory controller during an initialization operation to enable the memory controller to build a database of device capabilities. Thereafter, the memory controller may issue commands and addresses to individual memory devices or groups of memory devices in accordance with the capabilities of the target device or group of devices. In other embodiments, one or more of the memory devices is initialized by the memory controller, for example, by assigning device identifiers (or at least one device identifier) and by programming device configuration registers with desired settings.

Once initialized with device identifiers, the memory devices monitor commands that propagate through the memory chain to determine if the commands require responsive action (e.g., data read, write and erase actions, parameter query response, status response, etc.). In one embodiment, each command issued by the memory controller includes device selection information that specifies a group of memory devices to which the command is directed (i.e., the target memory devices). For example, in one implementation, the device selection information includes a start-memory value and an end-memory value that together define a range of target memory devices. In another implementation, the device selection information includes a start-memory value and a range value that define a range of target memory devices and, in another implementation, each memory device in the chain is represented by a bit within a multi-bit device selection value, the bit being set if the corresponding memory device is part of the target group of memory devices.

Commands sent to target memory devices may include data read and write commands, erase commands, parameter query commands, status requests and may command or request any other action indicated by the device parameter information to be within the capability of the target memory devices. Also, in one embodiment, memory read operations involve transmission of separate data read and data pickup commands. That is, the memory controller issues a data read command to a target memory device (or target group of memory devices) specifying a number of data values be read from a specified address within the memory device. The memory device, in response, retrieves the data values from the storage array and stores the data values in an output buffer pending receipt of a data pickup command. After issuing the data read command, the memory controller delays for a period of time long enough for the data retrieval to be completed within the target memory device (e.g., as specified by the corresponding device parameter information), then issues a data pickup command that specifies the number of retrieved data values to be output from the target memory device. The target memory device receives and retransmits the data pickup command, appending the specified number of retrieved data values to the end of the data pickup command. Through this protocol, the transmission of read data on the signaling path is controlled entirely by the memory controller in each instance, thus simplifying the interface control circuitry within the individual memory devices. That is, no circuitry for controlling response latency or burst length (the number of values to be transmitted in response to a read command) or for arbitrating access to the output signal path need be provided within the individual memory devices. These and other aspects of the invention are described in greater detail below.

Overview of a Memory System having a Memory Chain

Figure 3:
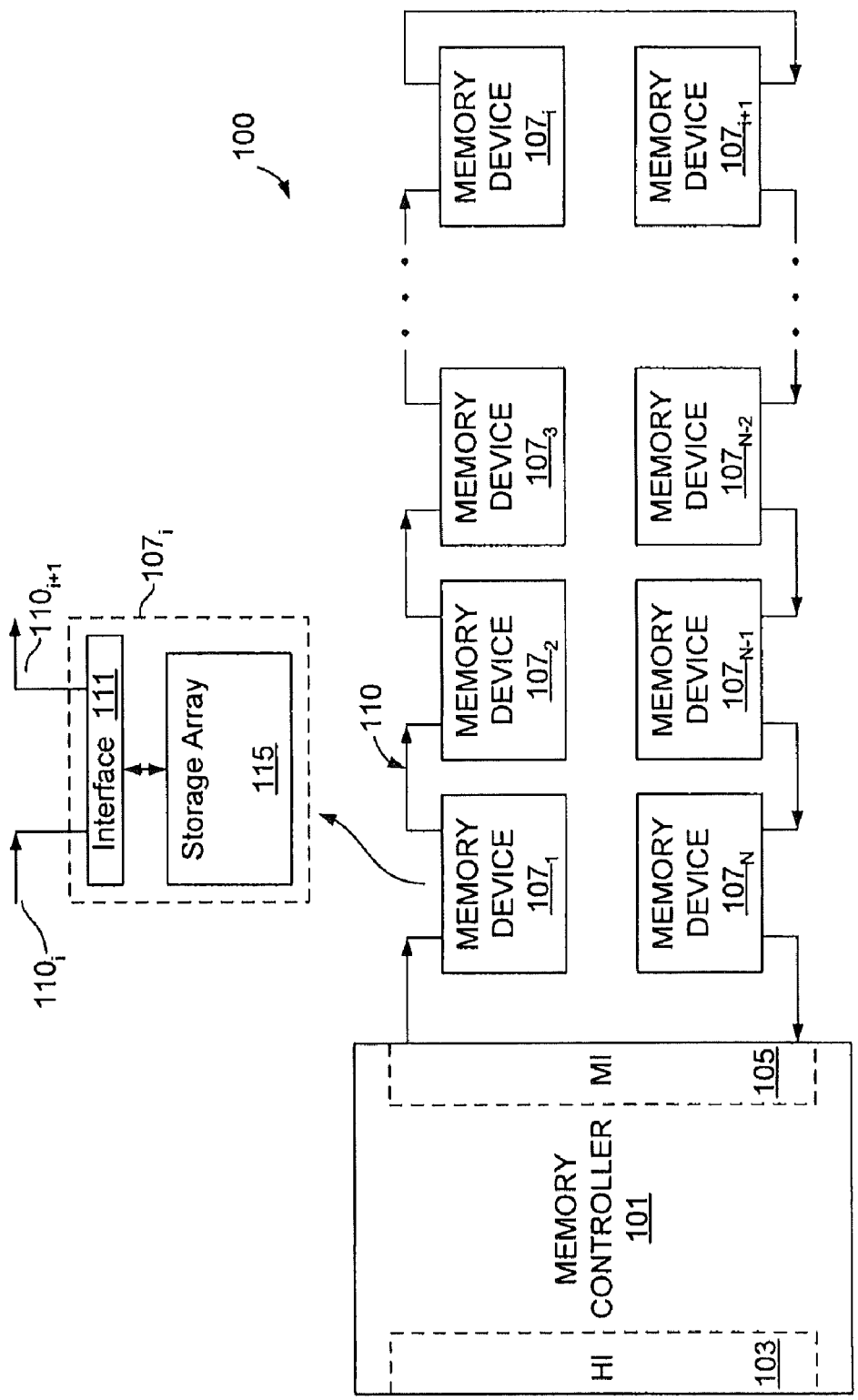
FIG. 3 illustrates a memory system according to an embodiment of the invention.

FIG. 3 illustrates a memory system 100 according to an embodiment of the invention. The memory system 100 includes a set of memory devices 1071-107N coupled one to another in a chain, with initial and final devices of the chain (1071 and 107N, respectively) being coupled to a memory controller 101. Referring to the detail view of memory device 107i, The memory devices 107 each include a signaling interface 111 and a storage array 115, the signaling interface 111 being used to receive and transmit data and commands propagating through the chain of memory devices, and the storage array 115 (which may include multiple storage arrays) being used for data storage. While the memory devices 107 are generally described below as having semiconductor storage arrays 115 (e.g., including, but not limited to, volatile storage arrays such as static random access memory arrays (static RAM) and dynamic RAM arrays; nonvolatile storage arrays such as programmable read only memory (PROM), erasable PROM (EPROM), electrically erasable or alterable EPROM (EEPROM), flash EEPROM, thyristor-based memory devices (so-called negative-device-resistance storage devices) and so forth), the storage arrays 115 may alternatively be formed using other media including, without limitation, various forms of magnetic and optical media. Also, the storage arrays 115 within the memory devices 107 need not be homogeneous. Rather, storage arrays of different types (e.g., different underlying storage media) and/or capacity may be provided in different memory devices of the chain, thereby enabling diverse memory systems to be constructed according to application needs and yet with a single point of access and control (i.e., separate memory controllers for the various storage types are not needed).

The memory controller 101 includes a memory interface 105 (MI) having an output coupled to an input of the initial memory device in the chain (1071), and an input coupled to an output of the final memory device in the chain (107N). The memory controller 101 also includes a host interface 103 (HI) to receive memory access requests, addresses and write data from, and to transmit read data and status information to, one or more host devices (not shown) such as a processor, application-specific integrated circuit (ASIC), video controller, direct memory access controller and/or other device capable of issuing memory access requests. The memory controller 101 may be formed in a discrete integrated circuit (IC) or, alternatively, in an integrated circuit device that includes the host device or other circuit blocks (e.g., in a chipset that includes a bus bridge, graphics port and processor interface, or in a system-on-chip). Also, the memory controller IC may be packaged with other ICs in various types of multi-chip packages (e.g., multi-chip modules, stacked packages, paper-thin packages, etc.). For example, in one embodiment, the entire memory system 100, including the memory controller 101 and the chain of memory devices 107 is packaged in a multi-chip package.

In the embodiment of FIG. 3, commands and data output from the memory controller 101 to the chain of memory devices 107 travel in one direction, first being received at the initial memory device 1071 and then being retransmitted to the next memory device in the chain (i.e., 1072) which receives and retransmits in the same manner. By this operation, commands and data propagate through the chain of memory devices 107, being received and retransmitted by each memory device 107 in turn, until being returned to the memory controller 101 by the final memory device 107N. As a matter of nomenclature, a given memory device 107i is referred to herein as receiving data and commands from an upstream memory device 107i−1 and retransmitting data and commands to a downstream memory device 107i+1. In the case of the initial memory device 1071, data and commands are received directly from the memory controller 101 and, in the case of the final memory device 107N, data and commands are transmitted directly to the memory controller 107. In one embodiment, the signaling path 110 between adjacent memory devices (and between the memory controller and a memory device) is formed by a set of electrical signal conductors such as printed circuit traces (e.g., disposed on a substrate to which the memory devices are mounted), electrical cables (e.g., micro-coaxial cables, twin-axial cables, twisted-pair cables, flex cables, and so forth). In an alternative embodiment, the signaling paths may be established by direct contact between contacts or other interconnect structures disposed on adjacent memory devices (e.g., the memory devices being disposed such the contacts of adjacent memory devices abut one another to establish electrical contact). In yet other embodiments, fiber optic cables may be used to form the signaling paths between the memory devices and memory controller, or the signaling paths may be omitted altogether (or in part) and wireless connections used to establish communication links between adjacent devices (e.g., using infrared, radio-frequency or other wireless signaling technology) and/or between the memory controller and memory devices.

Still referring to FIG. 3, each of the signaling paths between adjacent devices in the memory system (including the memory controller and the initial memory device, and the final memory device and memory controller) is implemented by a respective point-to-point link 110 that originates in an output of the upstream device and terminates in an input of the downstream device. Referring to the detail view of memory device 107i, for example, signals are received from the upstream device via a point-to-point link 110i and transmitted to the downstream device via point-to-point link 110i+1. By this arrangement, and by designing and positioning the memory devices 107 such that each point-to-point link is a physically short, low-capacitance interconnection structure, extremely high signaling rates may be achieved on each link 110. In one implementation, for example, the memory devices 107 are designed with inputs on one side of the device IC and outputs on the opposite side, thus making it possible to place the memory devices physically close to each other so that extremely short, high-speed point-to-point links may be used. Alternatively, the memory devices may be mounted on edges, with all contacts coupled to the upstream and downstream point-to-point links 110 being disposed on the mounting edge.

In a specific embodiment, each of the point-to-point signaling links is implemented by conductive traces printed on a substrate to which the memory devices are mounted, enabling signaling rates of 12.8 Gigabits per second per pin and higher. In other embodiments, direct-connect structures such as those described in U.S. patent application Ser. No. 10/426,930, entitled "Direct-Connect Signaling System," which is hereby incorporated by reference in its entirety, may be used to establish electrical signaling rates approaching and possibly exceeding 40 Gigabits per second per pin.

In one embodiment, the signaling interface 111 of each the memory device 107 includes an interface register to store incoming data and commands for as briefly as one transmit interval (e.g., the cycle time or fraction of the cycle time of a clock signal) before retransmitting the data and commands to the downstream memory device. Thus, from a data transfer standpoint, the interface registers within the memory devices 107 collectively form a first-in, first-out (FIFO or queue) shift register, with a given data value (or command) being shifted progressively through the chain of memory devices 107 in successive transmit intervals. Accordingly, the overall signal path formed by the point-to-point links between the memory devices and memory controller, and by the interface registers within the memory devices is referred to herein as a signaling queue. The signaling queue may be arbitrarily long (i.e., as many memory devices as practicable may be added to the memory chain) because all the signals required by a given memory device are provided by its upstream neighbor. Thus, in contrast to the prior-art memory systems described in reference to FIGS. 1 and 2, the memory system 100 may be readily expanded to include virtually any number of memory devices 107 without loss of signaling quality (thereby maintaining high data throughput) and without consuming additional pins and input/output (I/O) circuitry on the memory controller 101.

Figure 4A:
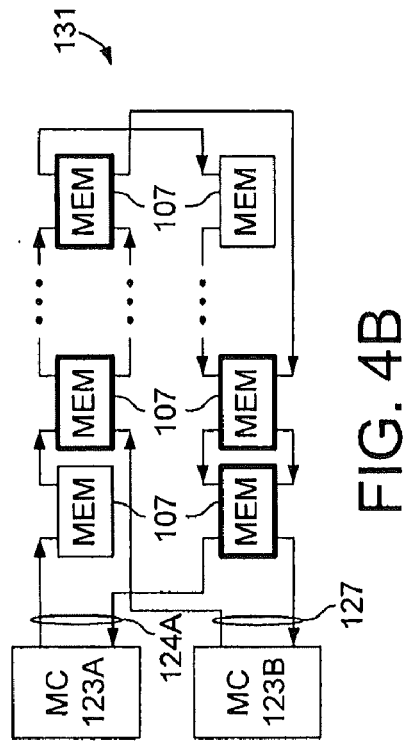
Figure 4B:
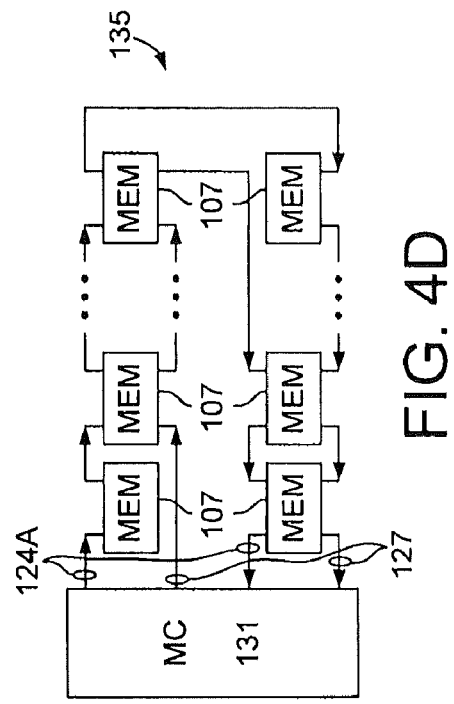
Figure 4C:
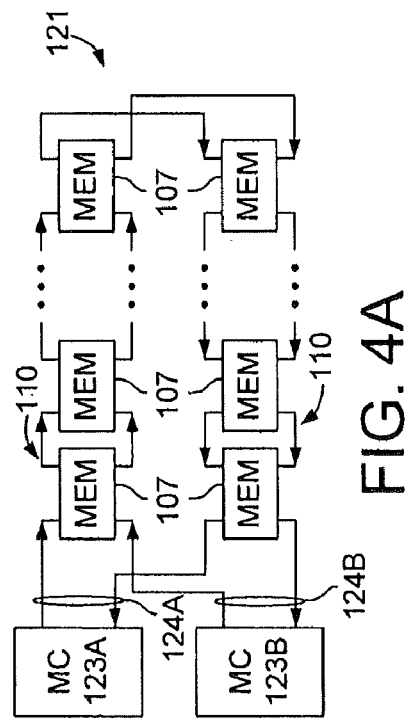
Figure 4D:
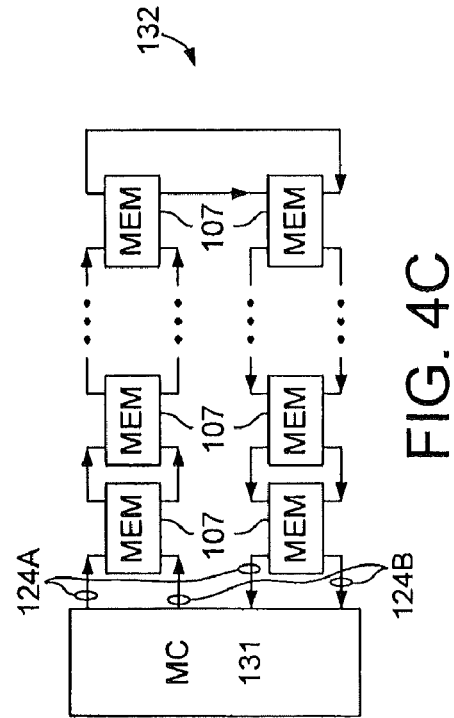

Still referring to FIG. 3, in other embodiments, the signaling paths 110 may be bi-directional rather than unidirectional, allowing data and/or control signals to travel through the memory chain in either direction. In such an embodiment, the link between the final memory device 107N and the memory controller 101 may be omitted, as transfers back to the memory controller (e.g., returned read data) propagate in reverse direction through the memory chain to reach the memory controller via memory device 1071. Also, while each memory device 107 is depicted as having a single input/output pair (I/O port), each memory device 107 or any subset of the memory devices 107 may also include one or more additional I/O ports. For example, in one embodiment, a first I/O port in each memory device 107 is used for data transfer and a second I/O port in each memory device 107 is used for command transfer. Alternatively, the first I/O port may be used for command and write data transfer and the second I/O port used for read data transfer. In another embodiment, the two I/O ports may be configured such that signals propagate through the memory chain in opposite directions, propagating from device 1071 to 107N in a first signaling queue and from device 107N to 1071 in a second signaling queue. In such an embodiment, the first signaling queue may be used to deliver commands and write data to the memory devices 107, and the second signaling queue used to deliver read data to the memory controller 101. In yet another embodiment, the two different I/O ports within the memory devices 107 (or a subset thereof) may be used to support different memory chains coupled to the same or different memory controllers. FIG. 4A, for example, illustrates an embodiment of a memory system 121 in which two separate signaling queues 124A and 124B, each including the same chain of memory devices 107, are controlled by separate memory controllers 123A and 123B. FIG. 4B illustrates an embodiment of a memory system 131 in which a first signaling queue 124A is formed by interconnection of a first set of memory devices 107 and a second signaling queue 127 is formed by interconnection of a subset of the memory devices 107 (the subset being shown in bold outline). The second signaling queue may also include memory devices not included within the first signaling queue. FIGS. 4C and 4D, for example, illustrate embodiments of memory systems 132 and 135 are similar to the embodiments of FIGS. 4A and 4B, respectively, except that a single memory controller 131 is used to control transfers on both signaling queues (i.e., on signaling queues 124A and 124B in FIG. 4C, and on signaling queues 124A and 127 in FIG. 4D). Also, as shown in FIG. 4E, multiple memory chains 1421-142N may be coupled to a single memory controller 141.

Each of the memory chains 142 are physically independent and can be of different lengths. Also, the memory controller may interact with the memory chains 142 independently or may aggregate the memory chains 142 (or any subset of the memory chains), for example, by retransmitting values received from a final memory device in one memory chain to an initial memory device in another memory chain.

Signaling Protocol in Chained Memory System

Figure 5A:
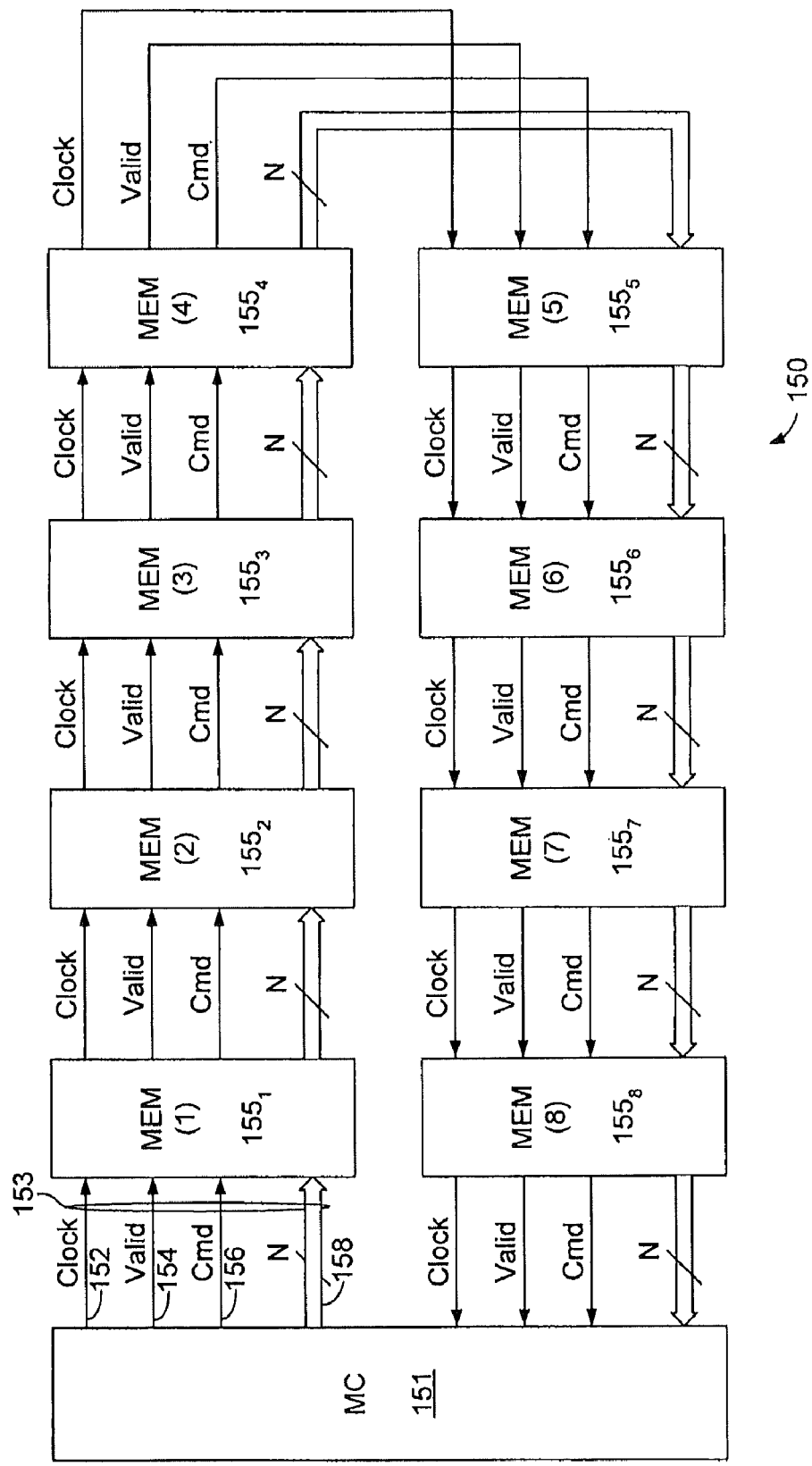
FIGS. 5A and 5B illustrate chained memory systems according to embodiments of the invention.

FIG. 5A illustrates a chained memory system 150 according to an embodiment of the invention. The memory system includes a memory controller 151 and eight chained memory devices 1551-1558 coupled in a ring by point-to-point signaling links 153. Each of the point-to-point signaling links 153 includes a clock line 152, valid line 154, command line 156 and a set of N multi-purpose lines 158. The clock line 152, valid line 154 and command line 156 are used to conduct a clock signal, valid signal and command signal, respectively. The clock signal is used to time receipt of the valid signal, command signal and signals on the multipurpose lines 158. The valid signal and command signal are protocol control signals. In one embodiment, the valid signal is asserted (e.g., raised to a logic high level) by an upstream device to indicate that a valid command or data value is being transmitted on the multipurpose lines 158. The command signal is asserted when the value transmitted on the multipurpose lines is a command (which may include address information), and deasserted otherwise.

The multi-purpose lines 158 are used at alternate times to transfer N-bit wide data values and command values and are referred to collectively herein as a bus. The term "bus" is used herein to mean a signaling structure for parallel transfer of bits of a multi-bit value. A bus may be a point-to-point link as in FIG. 5A, or a multi-drop structure. Also, while any or all of the signal lines within a given point-to-point signaling link 153 may be single-ended, each of the individual signal lines are preferentially differential (i.e., each formed by a pair of signal lines) to enable faster signaling rates.

In the embodiment of FIG. 5A, each of the memory devices 1551-1558 is assigned a progressively higher device ID according to its position within the memory chain. In the particular example shown, the initial memory device 1551 is assigned a device identifier one (1), the immediately downstream device 1552 is assigned a device identifier two (2) and so forth to the final memory device 1558 which is assigned a device identifier eight (8). As mentioned, more or fewer memory devices 155 may be included within the memory chain so that the final memory device has a higher or lower device ID. Also, different device ID schemes may be used in an alternative embodiment. For example, device identifiers of 1, 2, 4, 8, 16, 32, . . . , 2N−1 may be assigned to a chain of N memory devices so that each device ID corresponds to a bit position within a multi-bit device selector value and may therefore be selected to respond to a command or data by setting the corresponding bit within the device selector value. Also, groups of memory devices that are to be accessed as a unit may be assigned the same device ID. More generally, any scheme for enabling selection of individual memory devices 155 and/or groups of memory devices 155 may be used without departing from the scope of the present invention.

Link Timing

Figure 5B:
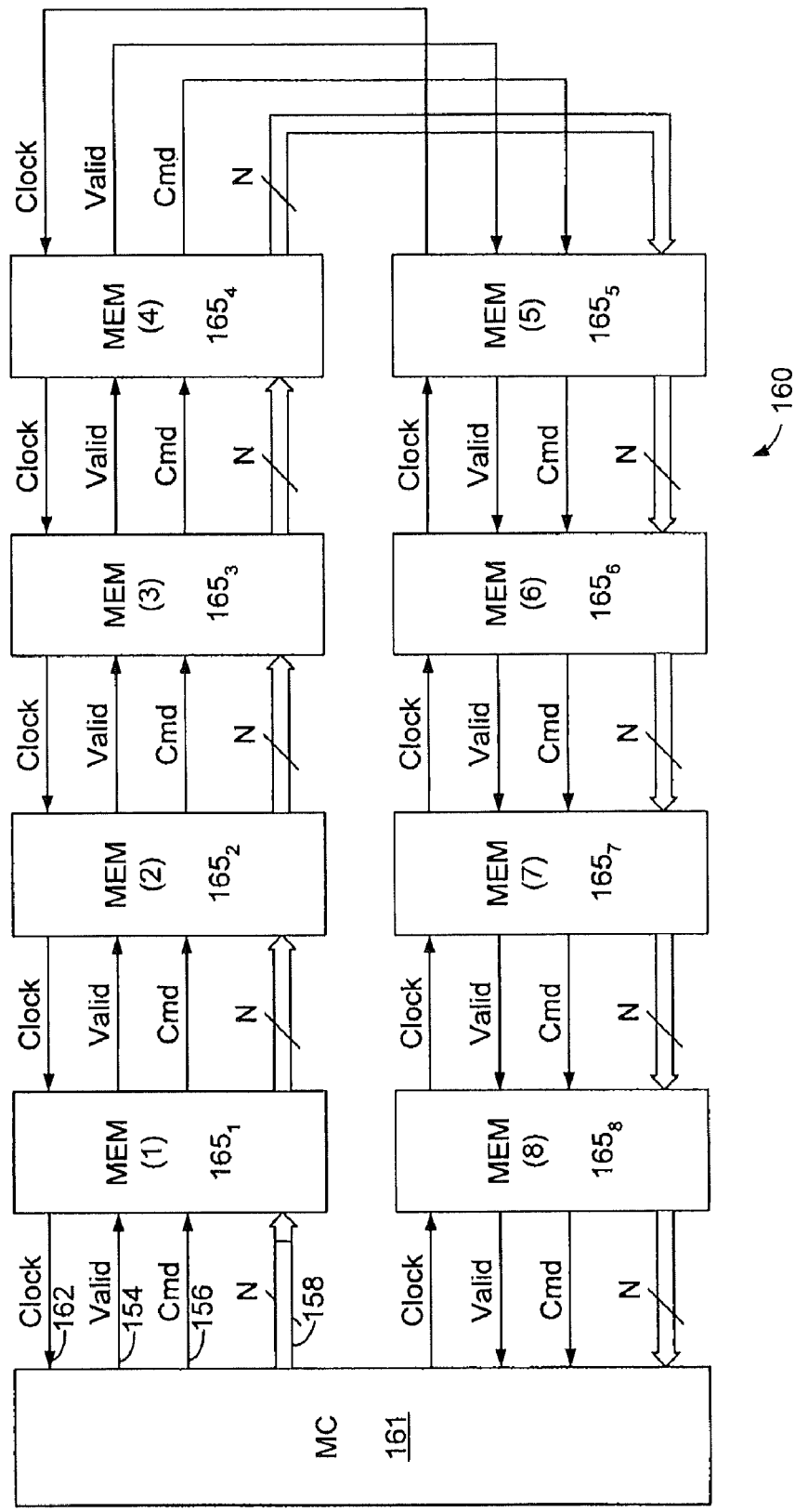
Figure 6:
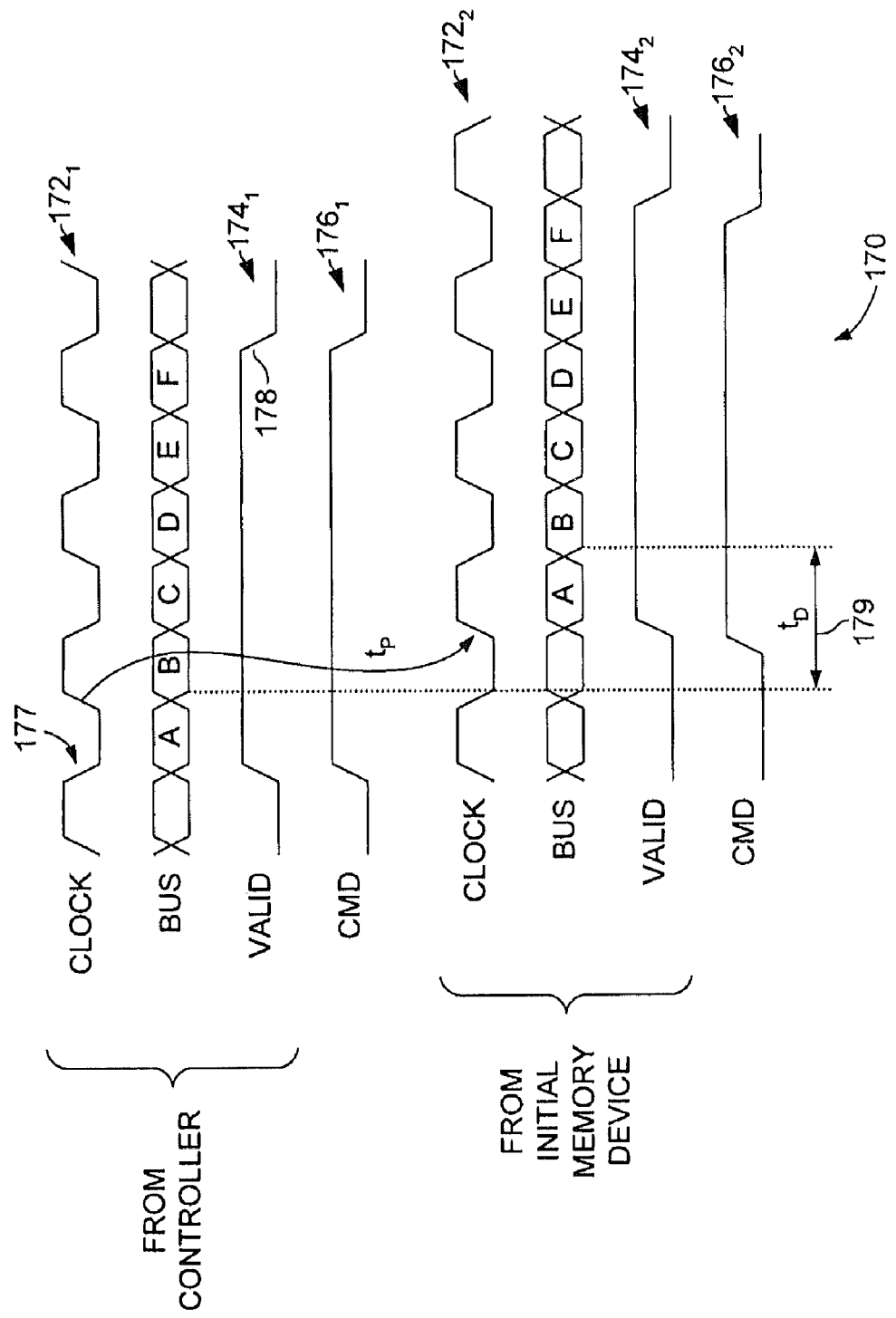
FIG. 6 is an exemplary timing diagram showing the relative timing of signals transmitted by the memory controller of FIG. 5A on a first point-to-point link, and then retransmitted by an initial memory device on a second point-to-point link.

FIG. 6 is an exemplary timing diagram 170 showing the relative timing of signals transmitted by the memory controller 151 of FIG. 5A on a first point-to-point link 153, and then retransmitted by the initial memory device 1551 on a second point-to-point link 153. Although depicted as single ended waveforms in FIG. 6, differential signals are used in the memory system 150 of FIG. 5A (as discussed, single-ended signaling may be used in alternate embodiments). Referring to both FIGS. 5A and 6, the memory controller 151 outputs a free-running clock signal 1721 on the clock line 152 coupled between the memory controller 151 and the initial memory device 1551. The clock signal 1721 may also be a strobe signal that is toggled only when data and/or commands are being transmitted on the point-to-point link 153. When command or data values are to be transmitted on the signaling queue (i.e., the overall transmission path formed by the point-to-point links 153 and memory devices 155), the memory controller 151 simultaneously asserts a valid signal 1741 on the valid line 154 (and a command signal 1761 on command line 156 if a command is being transmitted) and drives a first value, A, onto the bus 158, both in response to an edge 167 of the clock signal 1721. The memory controller 151 continues to assert the valid signal 1741 (and command signal if appropriate) as subsequent values B, C, D, E and F are transmitted onto the bus 158 in successive transmit intervals. In the embodiment of FIGS. 5 and 6, the transmit interval is a half cycle of the clock signal 1721 such that a new command or data value is transmitted on the bus in response to each rising and falling edge of the clock signal 1721 following edge 167. In alternative embodiments, the transmit interval may be a smaller fraction of the clock cycle (e.g., quarter cycle, eighth cycle, etc.) or may be an entire cycle of the clock signal 1721 or even multiple cycles of the clock signal. After the final value in the command or data sequence (value F in this example) has been transmitted, and if no immediately succeeding command or data value is to be transmitted, the memory controller 151 deasserts the valid signal 1741 as shown at 178.

Referring to the clock signal 1722, valid signal 1742, command signal 1762 and bus signals retransmitted by the initial memory device 1551, it can be seen that the clock signal 1722 is retransmitted with a propagation delay, tP, relative to the clock signal 1721 transmitted by the memory controller 151. The propagation delay tP has two components: a flight time component that reflects the propagation time on the point-to-point link 153 between the memory controller 151 and initial memory device 1551, and a retransmission delay that corresponds to the time required to sample the incoming clock signal 1721 in a receiver of the initial memory device 1551 and retransmit the clock signal 1722 in an output driver of the initial memory device 1551. In one embodiment, discussed in greater detail below, the signal receivers and output drivers used to receive and retransmit the clock signal 172 are identical to those used to receive and retransmit the valid signal 174, command signal 176 and signals on the bus 158. By this arrangement, each of the signals retransmitted by the initial memory device 1551 is delayed by the same (or substantially the same) propagation delay, tP. The valid signal 1741, command signal 1761 and bus signals are additionally delayed prior to retransmission by being stored within the interface register of the initial memory device for a single transmit interval (such signals may be stored for additional transmit intervals in alternative embodiments). Thus, as shown at 179, each command or data value retransmitted on the bus is delayed relative to transmission by the immediately upstream device by a hop time, tH, where tH includes the propagation time tP and a transmit interval, tI. By this operation, the full round trip flight time for command and data values transmitted on the signaling queue, including propagation time through the memory controller output driver and receiver circuits, is given by:

$$(N+1)*t_H \quad (1)$$

where '*' denotes multiplication and N is the number of memory devices 155 in the memory chain. In one embodiment, the clock signal $172_1$ output by the memory controller 151 oscillates at 6.4 GHz (higher or lower frequencies may be used in alternative embodiments). Thus, assuming a chain of eight memory devices as shown in FIG. 5A, the total time required for valid, command and bus signals to propagate through the entire signaling queue (i.e., the signaling queue flight time) is given by:

$$[****](N+1)*t_H=(N+1)*t_P+(N+1)*t_I=9*(78 \text{ picoseconds})+9*t_P=0.7 \text{ nanoseconds}+9t_P.$$

Assuming a roughly one-quarter clock cycle flight time on the point-to-point links themselves (achieved, as discussed above, by keeping the point-to-point links short) and, similarly a quarter clock cycle propagation delay through the receivers and output drivers of each memory device, then the propagation delay, $t_P$ is roughly equal to a transmit interval (78 picoseconds in this example), the single hop time, $t_H$, is roughly equal to two transmit intervals (156 picoseconds), and the signaling queue flight time is a mere 1.4 nanoseconds. Compared with the 30+ nanosecond access-time typical of many modern dynamic RAM memory devices, the signaling latency introduced by the signaling queue flight time is negligible. Even if the number of memory devices in the chain is increased tenfold, the flight time on the signaling queue is still substantially smaller than the access latency associated with many modern dynamic RAM devices. Thus, the flow-through nature of the signaling protocol and the extremely fast signaling rates on the point-to-point links moves the memory bottleneck that plagues many prior-art memory systems out of the logic and signaling domain and back to transistor switching speed; a problem inherently addressed by shrinking process geometries and other process improvements.

Referring again to FIG. 5A, it should be noted that different clocking schemes may be used to control the propagation of signals through the signaling queue in alternative embodiments. For example, rather than having each memory device issue a clock signal to its downstream neighbor, a clock signal may be supplied from a single source to all memory devices in the memory system and/or to the memory controller. The memory devices may include delay-locked loops (DLLs), phase-locked loops (PLLs) or other clock-phase adjustment circuitry to adjust the phase of the clock signals as necessary to sample incoming signals at a desired sampling instant. In other embodiments, signals transmitted on the N signal lines that form the bus may alternatively be time-multiplexed onto a smaller number of signal lines by the upstream device, then restored to N distinct signal conductors by the recipient, downstream device. For example, in one embodiment, a serializer circuit is provided at the output of the memory controller 151 and each memory device 155 to serialize an N-bit transmission onto a single differential signal line, and a deserializer circuit is provided at the input of each memory device 155 and the memory controller 151 to deserialize the N-bit transmission to recover the original N-bit value (i.e., thus effecting a SerDes operation).

In a serializing/deserializing embodiment, clock data recovery circuitry may be provided to recover a link clock signal from the incoming data signal. Similarly, in a non serializizing/deserialing embodiment, signal encoding may be used (e.g., 8-bit to 10-bit) to ensure that transmissions on individual bus signal lines contain sufficient transition density (i.e., transitions per unit time) to enable a clock signal to be recovered from the data signal transmitted on one or more of the bus signal lines.

In yet other alternative embodiments, the interface register may be omitted from the memory devices 155 to effect a stateless retransmission of commands and data through the signaling queue. In such a system, clock recovery circuitry (e.g., clock data recovery circuitry, phase-locked loop circuitry, delay-locked loop circuitry, etc.) may be used to generate or recover a clock signal having a precisely controlled phase, thereby enabling reliable reception and retransmission of signals at each hop of the signaling queue.

FIG. 5B illustrates a chained memory system 150 according to an alternative embodiment of the invention. The memory system includes a memory controller 161 and eight chained memory devices 1651-1658 coupled in a ring by point-to-point signaling links (more or fewer memory devices 165 may be provided in alternative embodiments). Each of the point-to-point signaling links is arranged and operated generally as described in reference to FIG. 5A (i.e., having a clock line 152, valid line 154, command line 156 and a set of N multi-purpose lines 158), except that a counter-flowing clock signal is issued on clock line 152. That is, the clock signal flows in a direction opposite the valid signal, command signal and bus signals, propagating through the memory chain from memory device 1658 to 1611 and ultimately back to the memory controller 161. A clock signal flowing in the opposite direction of signals that are sampled in response to the clock signal is helpful to guarantee signal hold times within the individual memory devices 165, as each recipient of valid, command and bus signals will perceive the clock signal transition (being the source of the clock signal) ahead of the valid, command and bus signals. In embodiments described below, reference is made to the signaling system of FIG. 5A. In all such embodiments, a counter-flowing clock signal may alternatively be used as shown in FIG. 5B.

Self-Initialization

In one embodiment, memory chain in FIG. 5A initializes itself by assigning an ascending sequence of device IDs to the constituent memory devices 1551-1558. This operation is referred to herein as a self-initialization operation, as the device IDs are determined by the memory devices 155 themselves rather than being programmed or otherwise assigned by the memory controller 151. In one embodiment, shown in FIG. 7A, each of the memory devices 1551-1558 includes a device ID input that is coupled to an external reference node (e.g., a ground node or supply voltage node) for the initial memory device 1551 and left unconnected on the remaining memory devices 1551-1558 (such input being internally pulled up or down), thereby enabling memory device 1551 to determine itself to be the initial memory device in the memory chain, and enabling the other memory devices 1552-1558 to determine themselves to be downstream from at least one other memory device. In an alternative embodiment, each upstream memory device may output a signal to its downstream neighbor so that only the initial memory device (for which there is no upstream memory device) does not receive the signal and therefore determines itself to be the initial memory device. In another alternative embodiment, internal configuration circuits within the memory devices may be programmed, for example, at system production time by storing values indicative of device status (initial memory device or not) in a non-volatile storage of the memory device (including, without limitation, a one-time programmable storage implemented by a fusible circuit or the like). More generally, any arrangement that enables the individual memory devices to self-determine whether they are the initial memory device in a memory chain may be used in self-initialization embodiments of the invention.

Figure 7A:
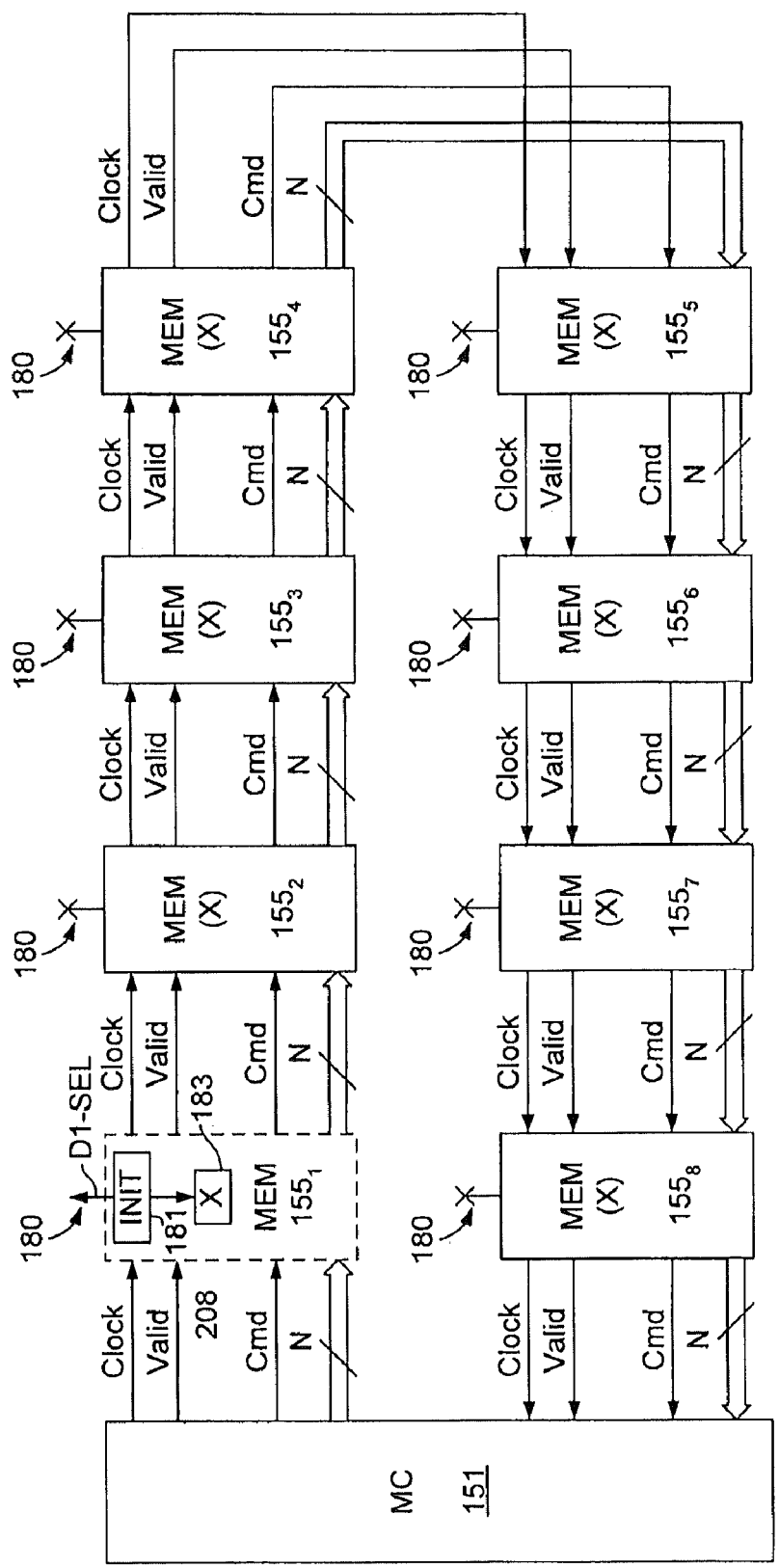
FIGS. 7A-7E illustrate a self-initialization operation within the memory system of FIG. 5A according to an embodiment of the invention.
Figure 7B:
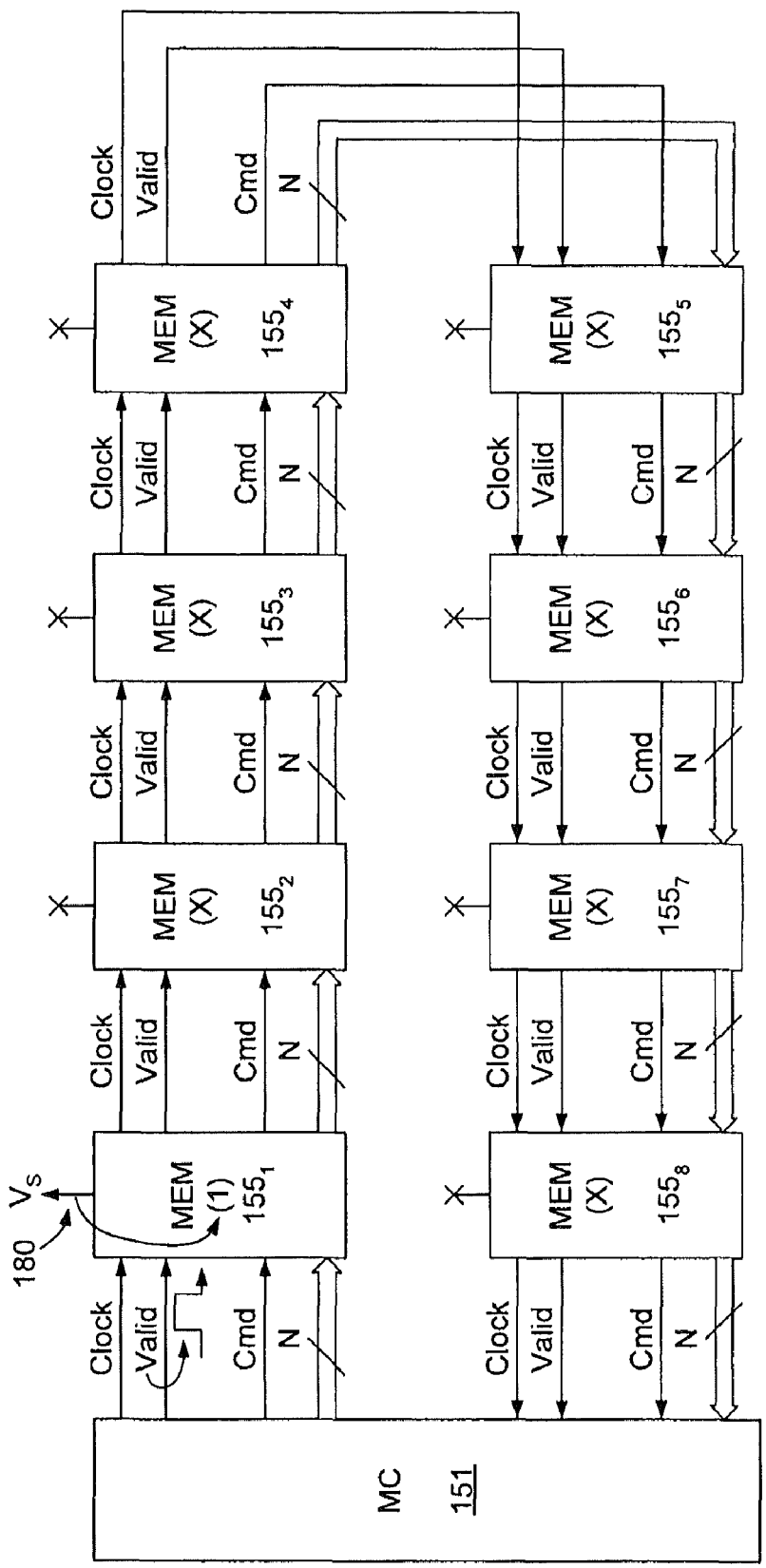

In the embodiment of FIG. 7A, each of the memory devices 155 includes a device ID register 183 in which the device ID is stored, and an initialization state machine 181 that stores a device ID value in the device ID register 183 according to the state of the device ID input 180 and, if indicated by the device ID input 180 not to be the initial memory device, according to a value received from an upstream memory device. In one implementation, the values stored within the device ID registers 183 at system startup are undefined (as indicated by the symbol 'X'). Alternatively, each memory device 155 may power up with (or be automatically initialized to have) a predetermined startup ID in the device ID register 183. The initialization circuit 181 within each memory device senses the state of the device ID input 180 in response to receipt of a valid signal from an upstream device and, if indicated to be the initial memory ID device, records a predetermined initial-device ID within the ID register 183. In one embodiment, the initial-device ID is '1', although other initial device IDs may be used. Also, in an embodiment which initializes the device ID register 183 of each memory device 155 to the device ID of an initial memory device, the device ID need not re-recorded by the initial memory device. If the device ID input 180 does not indicate initial memory device status, then the initialization circuit 181 records a device ID according to a value received on the bus. In either case, the initialization circuit outputs an incremented device ID onto the signaling queue to be received by the downstream device.

Figure 7C:
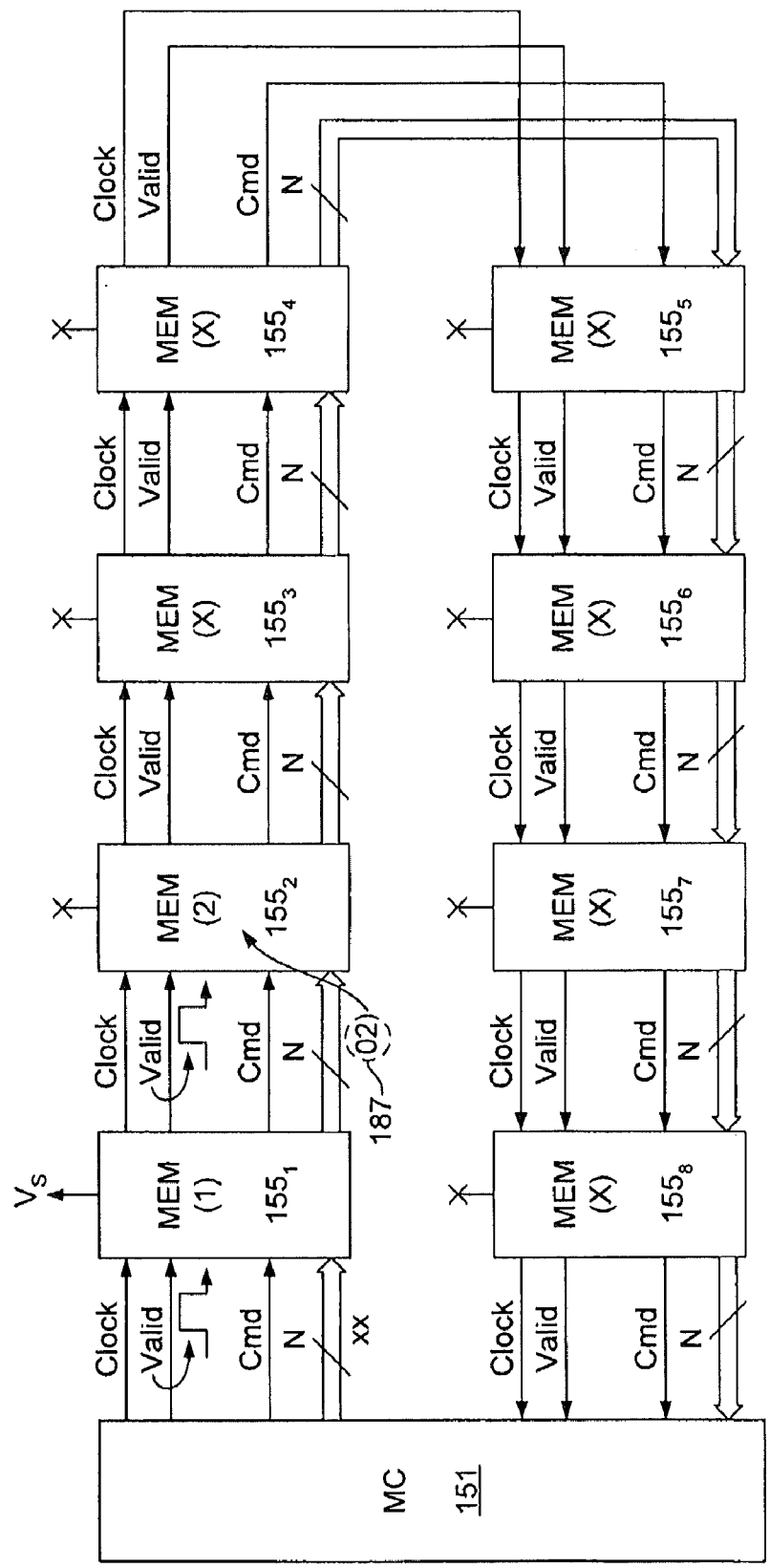

FIGS. 7B-7E illustrate the self-initialization sequence that results from the foregoing operations. Starting with FIG. 7B, the memory controller 151 asserts the valid signal to enable the initial memory device 1551 to self-initialize. Because the device ID input 180 of memory device 1551 is coupled to a reference voltage (a supply voltage, VS, in this example), the initialization circuit within memory device 1551 records device ID '1' in the device ID register. In the subsequent transmit interval, the initial memory device 1551 retransmits the valid signal to the downstream memory device 1552 and also outputs device ID '2' (i.e., the recorded device ID incremented by 1) onto the bus. Referring to FIG. 7C, the initialization circuit within memory device 1552 receives a non-initial-device indication at its device ID input 180 and therefore records a device ID based on the device ID 187 (i.e., '2') transmitted by the upstream memory device 1551. In the embodiment of FIGS. 7B-7E, the initialization circuit within each non-initial memory device records the actual device ID value transmitted by the upstream memory device as the device ID, then transmits an incremented version of the recorded device ID. Thus, memory device 1552 records device ID '2' in its device ID register and transmits device ID '3' to the downstream memory device 1553 along with a valid signal. In an alternative embodiment, the upstream memory device may transmit its own device ID (i.e., memory device 1551 transmits device ID '1') and the initialization circuit within the downstream memory device may increment the received device ID to generate the device ID stored within its device ID register and transmitted to the subsequent downstream device.

Figure 7D:
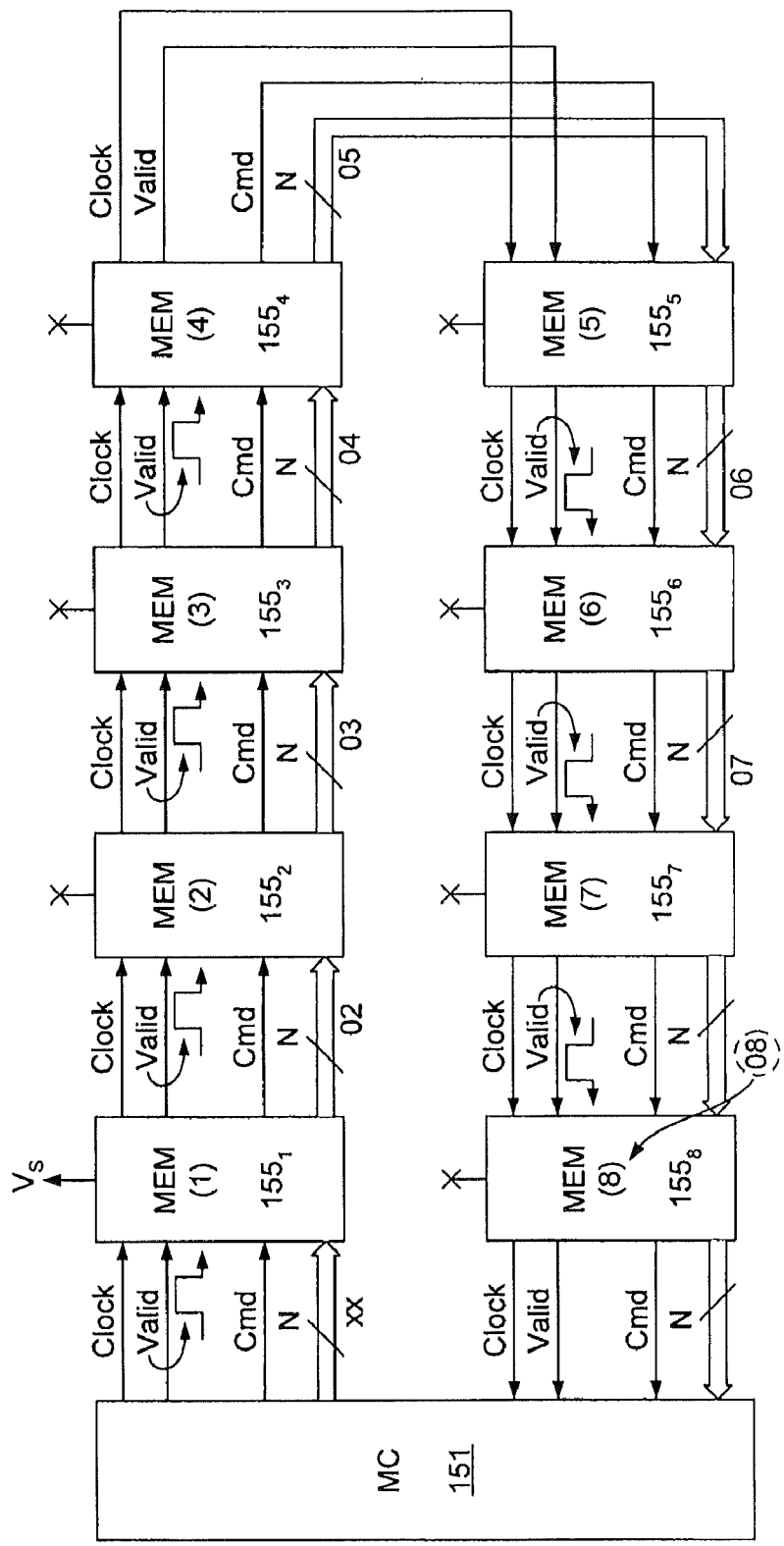
Figure 7E:
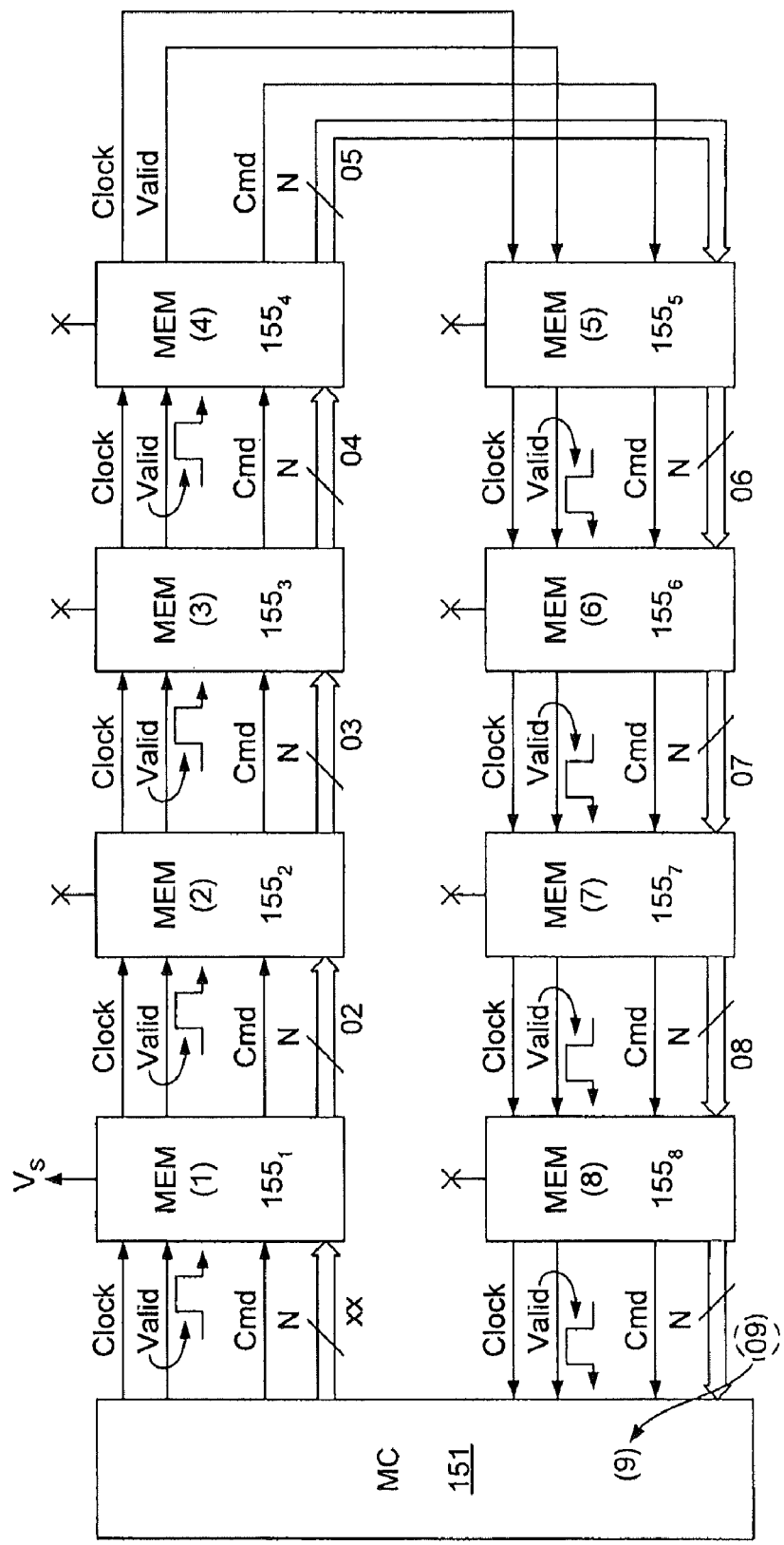

As each memory device in the chain records a device ID and transmits an incremented device ID to its downstream neighbor, an ascending sequences of device IDs is assigned until, as shown in FIG. 7D, the final memory device in the chain records device ID 'N'. In the particular embodiment shown, the memory chain includes eight devices, so that device ID '8' is recorded by the initialization circuit of the final device 1558. Referring to FIG. 7E, the initialization circuit of the final memory device 1558 retransmits the valid signal and device ID '9' to the memory controller 151, thereby concluding the self-initialization of the memory chain and informing the memory controller 151 of the number of memory devices in the memory chain.

Parameter Information

Referring again to FIG. 5A, after the memory devices 1551-1558 have self-initialized (or otherwise have been assigned device IDs), the memory controller 151 queries each memory device 155 to obtain information that describes the device capabilities. This information is referred to herein as device parameter information and is transmitted on the signaling queue in one or more device parameter packets. FIG. 8 illustrates an exemplary device parameter packet 201 transmitted by a memory device 155 in response to a parameter query command from the memory controller 151. The constituent values of packets transmitted on the signaling queue, including the device parameter packet 201, are referred to herein as words and are numbered according to the transmit interval in which they are transmitted on the bus (i.e., word1, word2, . . . ). In the embodiment of FIG. 8 and embodiments described below, the signaling queue is assumed to have an 8-bit wide bus so that each constituent word within the packets transmitted on the signaling queue are 8-bit values (i.e., bytes). Wider and narrower buses and/or word widths may be used in alternative embodiments.

Within the exemplary device parameter packet 201 of FIG. 8, the first word (Word1) specifies the maximum rate at which the memory device can receive and transmit data. In embodiments in which multiple signaling queues are used, separate fields within Word1 or additional words may be used to specify the max rate for each of the different signaling queues (e.g., a slower rate may be used for a write/command queue than for a read queue). The second word of the device parameter packet 201, Word2, is an address length specifier that specifies the number of address bits that can be used to address the memory device. Assuming that the storage capacity of the memory device corresponds to a power-of-two value, the address length specifier defines the storage capacity of the memory device (i.e., storage capacity=2Num Addr Bits). Alternatively, the storage capacity may be explicitly specified within the device parameter packet, thus enabling specification of address spaces that do not fall on power-of-two boundaries. Word3 of the device parameter packet 201 specifies the maximum number of data words the memory device can output in response to a single data pickup command, a value referred to herein as a burst length. Word4 and Word5 specify minimum access times for the memory device. For example, in a dynamic RAM device, Word 4 specifies the minimum access time in event of a page hit (i.e., the requested read data resides in a page buffer of the memory device as a result of a prior read to the same page) and Word5 specifies the minimum access time in the event of a page miss. In one embodiment, the memory controller tracks open pages within the various dynamic RAM memory devices (or other memory devices having a page buffer architecture) and therefore may determine in advance whether a given data read request will result in a page hit. Consequently, the memory controller, having received the minimum access time parameters for each of the memory devices in the memory chain, waits for either the page-hit access time or the page-miss access time according to the determination of whether a given data read will result in a page hit. In the embodiment of FIG. 8, Word6-Word9 of the device parameter packet 201 are used to convey parameters that are specific to individual memory device manufacturers (e.g., a code to identify the manufacturer and device and/or codes to specify other manufacturer-specific information). Any number of additional parameters may be included within the device parameter packet 201 in alternative embodiments including, without limitation, parameters specific to the nature of the storage media of the memory device (e.g., block size information in a flash EEPROM) and the storage array architecture (e.g., number of memory banks, architecture-specific access restrictions, etc.).

In one embodiment, the memory controller 151 of FIG. 5A outputs a single parameter query command onto the signaling queue to instruct each of the memory devices 1551-1558 to output its parameter information; in effect, broadcasting the parameter query command. Each of the memory devices 155, in response, loads parameter information into its output buffer in the format of the device parameter packet 201, then transmits the parameter information, word by word onto the signaling queue, thus outputting a device parameter packet to the memory controller. In one embodiment, each of the memory devices 155 outputs a device parameter packet 201 onto the signaling queue starting in the first transmit interval after retransmission of the device parameter packet 201 sourced by its upstream neighbor. By this operation, each memory device 155 effectively appends its device parameter packet 201 to the end of a sequence of device parameter packets 201 from one or more upstream memory devices (i.e., except for the initial memory device which outputs the first device parameter packet 201) so that the memory controller 151 receives a continuous stream of device parameter packets 201 according to the number of memory devices in the memory chain. In alternative embodiments, the memory controller 151 may issue multiple parameter query commands each instructing an individual memory device 155 or group of memory devices to output device parameter packets 201. In either case, the memory controller records the device parameter information received for each memory device 155 in a parameter database for later use.

Command and Data Transfer

Figure 11:
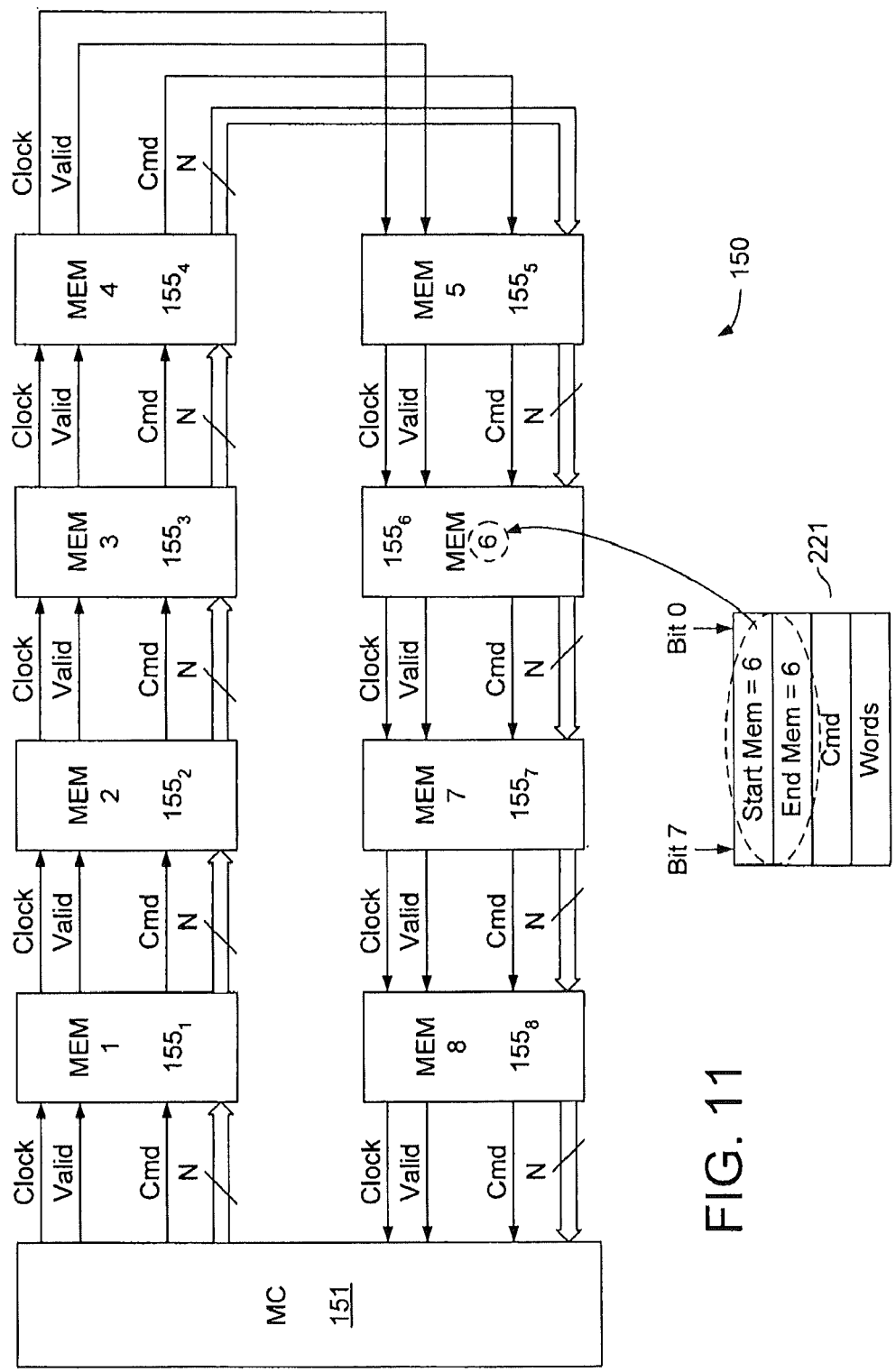
FIG. 11 illustrates an exemplary short-form command packet directed to a single memory device within the memory system of FIG. 5A.
Figure 12:
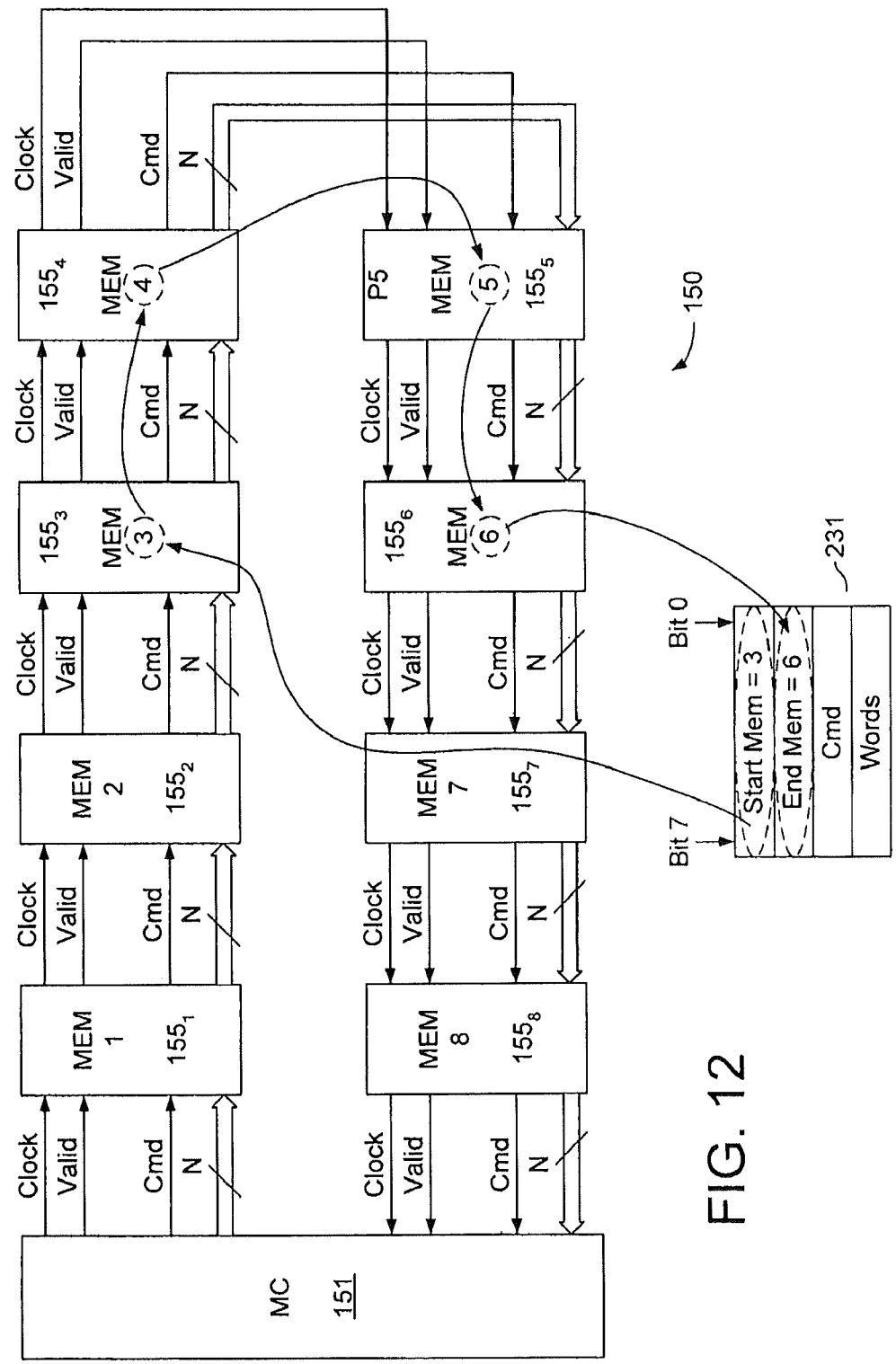
FIG. 12 illustrates an exemplary short-form command packet directed to a range of memory devices within the memory system of FIG. 5A.

FIGS. 9 and 10 illustrate formats of exemplary short-form and long-form command packets 203 and 220, respectively, that may be used to convey corresponding short-form and long-form commands in embodiments of the invention. Referring first to the short-form command packet 203 shown in FIG. 9, Word1 and Word2 are referred to herein as device selectors and are used identify the memory device or group of memory devices to which the command is directed (i.e., the target memory device or target group of memory devices). In an embodiment in which memory devices are assigned sequential device identifiers, Word1 is a starting device selector that specifies a starting memory device within the target group, and Word2 is an ending device selector that specifies an ending memory device within the group. By setting the starting and ending memory device selectors to the same value, a single memory device may be targeted by the command. Alternatively, by setting the starting and ending device selectors to different values, a group of adjacent memory devices (referred to herein as a range) may be targeted, with the group encompassing all or a subset of the memory devices within the memory chain. FIG. 11 illustrates an exemplary short-form command packet 221 directed to a single memory device 1556 within memory system 150 of FIG. 5A, and FIG. 12 illustrates an exemplary short-form command packet 231 directed to a range of memory devices, 1553-1556 within memory system 150. In each case, all the memory devices 155 in the chain receive and retransmit the short-form command packet (221 and 231), but only the memory devices specified by the starting and ending device selectors respond to the specified command. Thus, only memory device 1556 responds to the command set forth in command packet 221, and only memory devices 1553, 1554, 1555 and 1556 respond to the command set forth in command packet 231.

As discussed above, alternative device selection schemes may be used in alternative embodiments, including using a device selector value (which may be constituted by one or more words of a short-form or long-form command packet) that includes constituent bits that correspond to respective memory devices of the memory chain. Such a device selector is referred to herein as a selector mask and may be used to select groups of non-adjacent memory devices to respond to a given command. In the embodiments discussed below, starting and ending device selectors are shown and described. In all such embodiment, however, other device selector schemes may be used, including a selector mask scheme.

Returning to FIG. 9, Word3 of the short-form command packet 203 is referred to herein as a command specifier and specifies the command to be executed by the target memory devices. In one embodiment, depicted at 205 of FIG. 9, the command specifier is an eight-bit value in which the most significant bit 209 (bit 7) is a packet format bit (L) that indicates whether the command packet is a long-form command packet or short-form command packet. In one embodiment, shown in FIG. 10, long-form command packets 220 have the same format as short-form command packets 203 in words Word1-Word4 and additionally include a number of address words (five address words in this example, providing a terabyte of addressable storage). Thus, long-form command packets 220 are used to convey read and write commands and other commands that specify address values or ranges of address values within the target memory devices.

Returning to the exemplary command specifier 205 of FIG. 9, the next most significant bit 211 (bit 6), is the data pickup bit (P) and indicates whether the command includes a request to pickup data, such commands being referred to herein as data pickup commands. In a data pickup command, Word4 of the command packet is used to specify the number of words to be output by each of the target memory devices. The remaining six bits of the command word 205 are referred to herein as the command field 215 and are used to specify specific commands including, without limitation, read, write, erase and refresh commands, as well as commands to control the power mode of a target memory device, query the device parameters (i.e., the above-mentioned query parameter command), and reset the target memory device. In general read, write and erase commands are issued in long-form command packets 220 as memory addresses are typically provided with such commands. In one embodiment, read, write and erase commands issued in short-form command packets 203 are interpreted by the target memory devices as status read, configuration write (e.g., to a device configuration register) and configuration and/or status reset commands, respectively. Alternatively, other combinations of bits within the command specifier 205 may be used to indicate such commands.

Reflecting on the command and data packet formats illustrated in FIGS. 9 and 10, it should be noted that the absence of address strobe signals and other memory-device-specific signals issued by traditional memory controllers (e.g., row address strobe (RAS) and column address strobe (CAS) signals issued by traditional dynamic RAM controllers) simplifies the design and operation of the memory controller and enables the memory controller to work with numerous different types of memory devices. Memory-device-specific issues relating to reading, writing and access time are managed by the lightweight command protocol and/or within the memory devices themselves. In alternative embodiments, the memory controller may issue such device-specific signals to provide legacy support for commercially available memory devices. It should also be noted that, in the embodiments described in reference to FIGS. 9 and 10 and the data and command transfer examples of FIGS. 11-16, only the memory controller initiates transfers on the signaling queue. Memory devices may add items to (or substitute items in) the command and data structures output by the memory controller, but only when explicitly signaled to do so (e.g., by issuance of data pickup commands). In alternative embodiments, memory devices may output data when it is retrieved and without awaiting a specific output command (i.e., data pickup command) from the memory controller. In such embodiments, the memory controller is designed to schedule read commands and other commands that solicit data from the memory devices to avoid conflicts on the signaling queue.

In one embodiment; all packets transferred on the signaling queue, including the parameter packet of FIG. 8 and the short and long form command packets of FIGS. 9 and 10, are concluded by one or more error checking values, such as a checksum, cyclic redundancy check (CRC) value, or the like. In the case of command packets, the memory devices regenerate the error checking value based on the constituent words of the command and confirm the integrity of the command by comparing the regenerated error checking value with the error checking value provided in the command packet. If a mismatch is detected, the command is rejected and, optionally, an error notification is sent to the memory controller. The memory controller, in response, may reissue the command. Also, the memory controller may, upon receiving a threshold number of error notifications, take corrective action such as reducing the transfer rate on the signaling queue.

Transmission of a short-form command packet 203 or long-form command packet 220 may be followed by one or more data packets, such data packets being, in effect, appended to the end of the command packet transmission. FIG. 9 illustrates the format of an exemplary data packet 207 having S constituent data words. In one embodiment, data packets have a fixed number of constituent words (i.e., S is constant) and are followed by an error checking value, thus enabling the recipient device (memory device or memory controller) to confirm the integrity of the data packet. Also, by fixing the number of data words per data packet, the position of error checking values within a stream of data words is fixed by protocol, simplifying identification of error checking values within the data stream and reducing the likelihood of synchronization error. In such an embodiment, Word4 of the command packet (referred to herein as a word count value) is used to specify the total number of data words (and therefore the number of data packets) that follow the command. In an alternative embodiment, the number of data words per data packet is unlimited, except by the size of the input buffer of the target memory device (or the memory controller), with the word count value being used to specify the number of data words in the packet. While data packets may be transmitted by the memory controller following any command, data packets are used primarily in conjunction with write commands (e.g., long-form command packets that specify a write address, number of words to be written (in Word4) and in which the command word specifies a write operation). Similarly, data packets are transmitted by the memory devices primarily following read commands, but may be transmitted in response to other commands (e.g., parameter packets may be viewed as a special form of data packets that are transmitted in response to parameter query commands).

Figure 13:
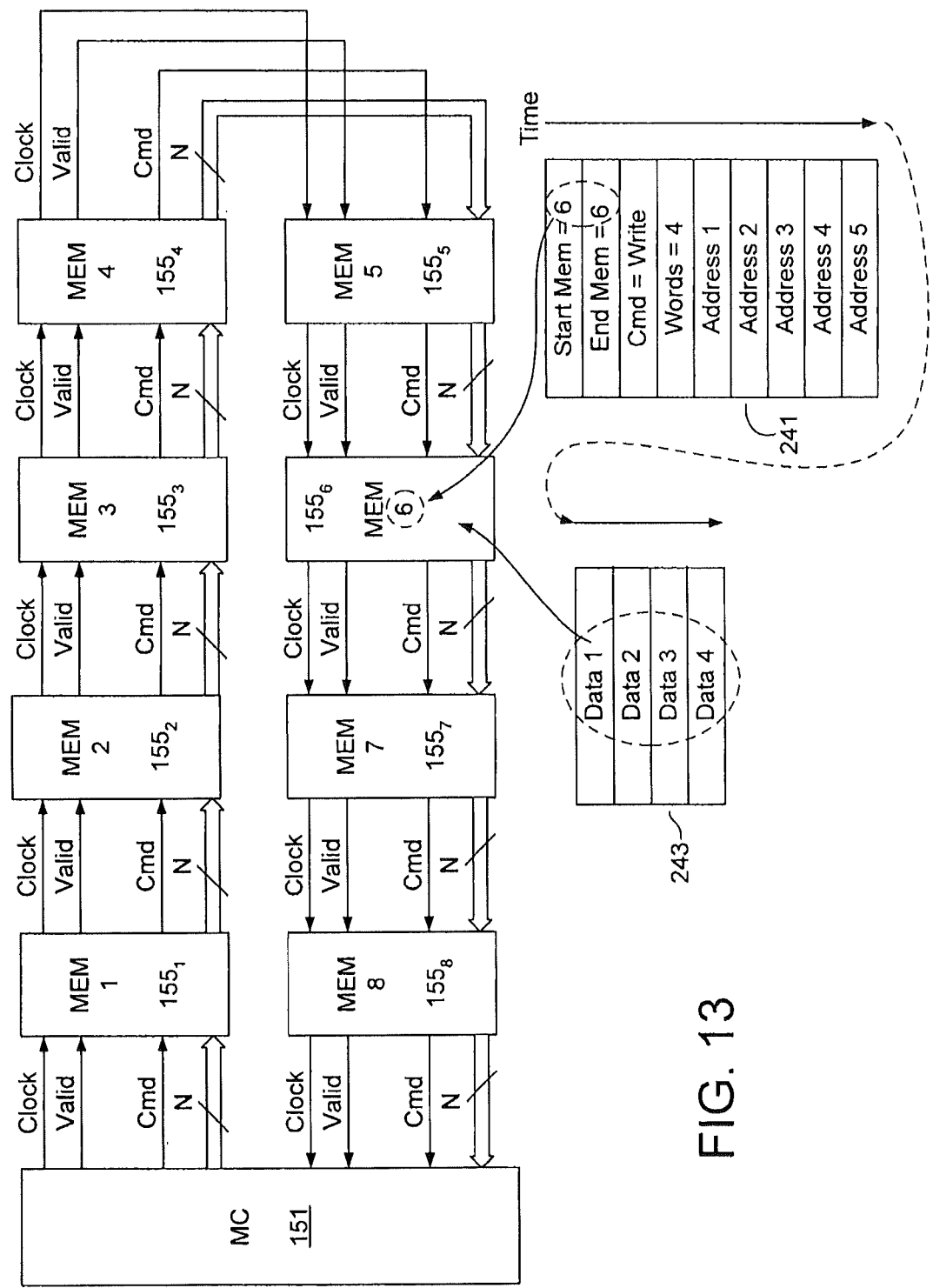
FIG. 13 illustrates an exemplary long-form command packet for a write command directed to memory device.

FIG. 13 illustrates an exemplary command packet 241 for a write command directed to memory device 1556. As shown, the command packet 241 is a long-form command packet in which the device selectors specify device ID '6', the command specifier indicates a write operation, the number of data words to be written is four (WORDS=4) and in which a set of address words specify the starting write address. A data packet 243 containing the four words to be written is transmitted back-to-back with the command packet (i.e., transmitted in the first available transmit interval following transmission of the command packet). Though not shown in FIG. 13, error checking values may be included in both the command packet 241 and data packet 243 (e.g., at the end of each) or a single error checking value may be transmitted at the end of the data packet 243 to cover the contents of both the data and command packets.

Figure 14:
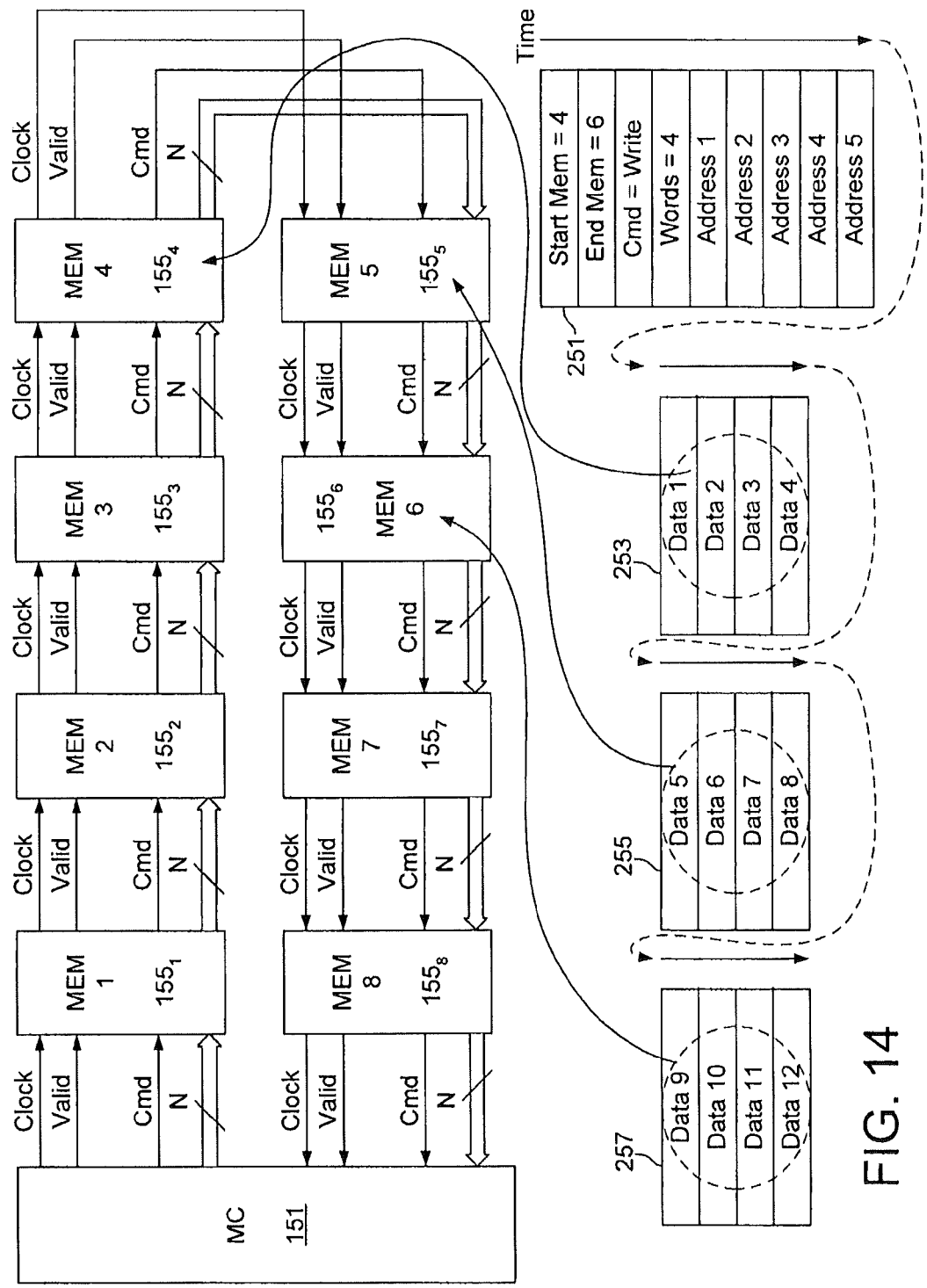
FIG. 14 illustrates an exemplary long-form command packet for a write command packet directed to a range of memory devices.

FIG. 14 illustrates an exemplary command packet 251 for a write command packet directed to a range of memory devices 1554-1556. The command packet 251 is a long-form command packet in which the device selectors specify device IDs inclusively between '4' and '6', the command specifier indicates a write operation, the number of data words to be written into each target memory device is four (WORDS=4), and in which a set of address words specify the starting write address. Three data packets 253, 255 and 257 containing the data words to be written to memory devices 1554, 1555 and 1556, respectively, are transmitted one after another starting at the first available transmit interval following transmission of the command packet 251. In one embodiment, referred to herein as a partial-retransmit embodiment, a data packet transmitted following a write command and directed to a given memory device is not retransmitted by the memory device. Thus, in a partial-retransmit embodiment, memory device 1554 receives all three data packets 253, 255 and 257, but retransmits only data packets 255 and 257 (data packet 253 being directed to memory device 1554). Similarly, memory device 1555 receives data packets 255 and 257, but retransmits only data packet 257, and memory device 1556 receives data packet 257 and retransmits no data packet. Because each memory device 155 deasserts the valid-out line (i.e., the valid line driven by the memory device) during the non-retransmission intervals, a downstream target memory device receives only the retransmitted data words and consumes the specified number of data words starting with the first received data word following receipt of the write command. Thus, in the example shown in FIG. 14, the first four data words received by memory device 1554, data words 1-4, are buffered within device 1554 without re-transmission, while the remaining data words 5-12 are retransmitted. Similarly, the first four data words received by memory device 1555, data words 5-8, are buffered within memory device 1555 without re-transmission, while remaining data words 9-12 are retransmitted, and the only four data words received by memory device 1556, data words 9-12, are buffered within memory device 1556 without re-transmission. Thus, each target memory device 155 perceives the incoming stream of data words to be directed to it, buffers the specified number of data words without re-transmission, then retransmits the remaining data words. The buffered data words are eventually stored within the storage array of the target memory device, or may be stored one after another in pipelined fashion as the data words are buffered. By this arrangement, each memory device consumes data words from the stream of data words following the write data command until the appropriate number of data words have been buffered, and each subsequent memory device in the target group receives the stream of data words less those consumed by the upstream device.

In an alternative embodiment, referred to herein as a full-retransmit embodiment, each of the memory devices 155 is designed to retransmit all received data words, including those buffered for storage within the memory device. In a full-retransmit embodiment, each memory device 155 within a target group identifies a subset of data words to be buffered within the device according to the position of the memory device within the target group and the number of words to be buffered by each of the memory devices. That is, each target memory device 155 buffers data words numbered $(X*W)+1$ to $(X+1)*W$, where W is the number of data words specified by the write command to be stored in the memory device, and X is the device number within the target group (starting from zero). Referring to FIG. 14, for example, memory device 1554 determines itself to be the first memory device (device zero) within the target group based on the device selector values in the write command packet 251, and therefore buffers the first four of twelve data words (data words 1-4), retransmitting all twelve data words. Memory device 1555 determines itself to be the second memory device within the target group and therefore buffers the second four of twelve data words (data words 5-8), retransmitting all twelve data words. Finally, memory device 1556 determines itself to be the third memory device within the target group and therefore buffers the third four of twelve data words (data words 9-12), retransmitting all twelve data words. While the full-retransmit embodiment results in additional traffic on the signaling queue (i.e., all write data propagates through the full memory chain back to the memory controller), it offers the advantage of unconditional retransmission. That is, no decision need be made as to whether a given data word is to be retransmitted, potentially providing additional headroom for shrinking the transmit interval.

Data Pickup

In one embodiment, two types of data pickup commands are issued by the memory controller 151 of FIG. 5A: a data shuttle command and a parameter query command. The data shuttle command is issued to pickup data requested by a previously transmitted read command. That is, the memory controller 151 issues a long-form command packet to one or more target memory devices 155 specifying an address and number of words to be read from the memory devices. After an appropriate delay (e.g., according to the access time information recorded in the parameter database for the target memory devices), the memory controller issues the data shuttle command to the target memory devices 155 to instruct the memory devices 155 to transmit the read data. Thus, the data shuttle command represents, in effect, an output enable command issued by the memory controller. Using the exemplary command packet formats illustrated in FIGS. 9 and 10, a data shuttle command may be issued as a short-form command packet in which the command specifier includes a set data pickup bit 201 and a NOP command field 215 (NOP being an acronym for no operation). That is, L=0, P=1, and command field=000000.

As discussed above, the memory controller 151 issues the parameter query command to obtain parameter information from one or more memory devices 155. In one embodiment, the memory controller issues the parameter query command with data pickup indication, for example, by transmitting a short-form command packet (L=0) in which the command specifier indicates a data pickup (P=1) and the command field indicates a parameter query operation. Alternatively, the memory controller 151 may issue a parameter query command without data pickup (i.e., by clearing the data pickup bit in the command specifier) to instruct the target memory devices 155 to load device parameter information into their respective output buffers. Thereafter, the memory controller 151 may issue a data shuttle command to instruct the target memory devices 155 to output contents of their respective output buffers onto the signaling queue. In other embodiments, data pickup operations may be carried out on top of other types of commands. For example, a command packet may specify both a refresh and data pickup, a write operation and a data pickup, a read operation (data to be picked up later) and a pickup from a prior read command, and so forth.

In one embodiment, a target memory device 155 responds to a data pickup command by outputting the specified number of words (i.e., specified in the word count value of the command packet) from the output buffer of the memory device onto the signaling queue. More specifically, the starting memory device in a range or group of memory devices, outputs the specified number of data words in the transmit interval (or transmit intervals if more than one data word is to be output) immediately following the retransmission of the data pickup command itself. Thereafter, each downstream memory device 155 in the group of target memory devices outputs the specified number of data words from its output buffer immediately following retransmission of the final data word provided by the upstream device (or upstream devices), in effect, adding another set of data words (or at least one data word) to the overall shuttle of data words propagating through the memory chain to the memory controller 151.

Figure 15:
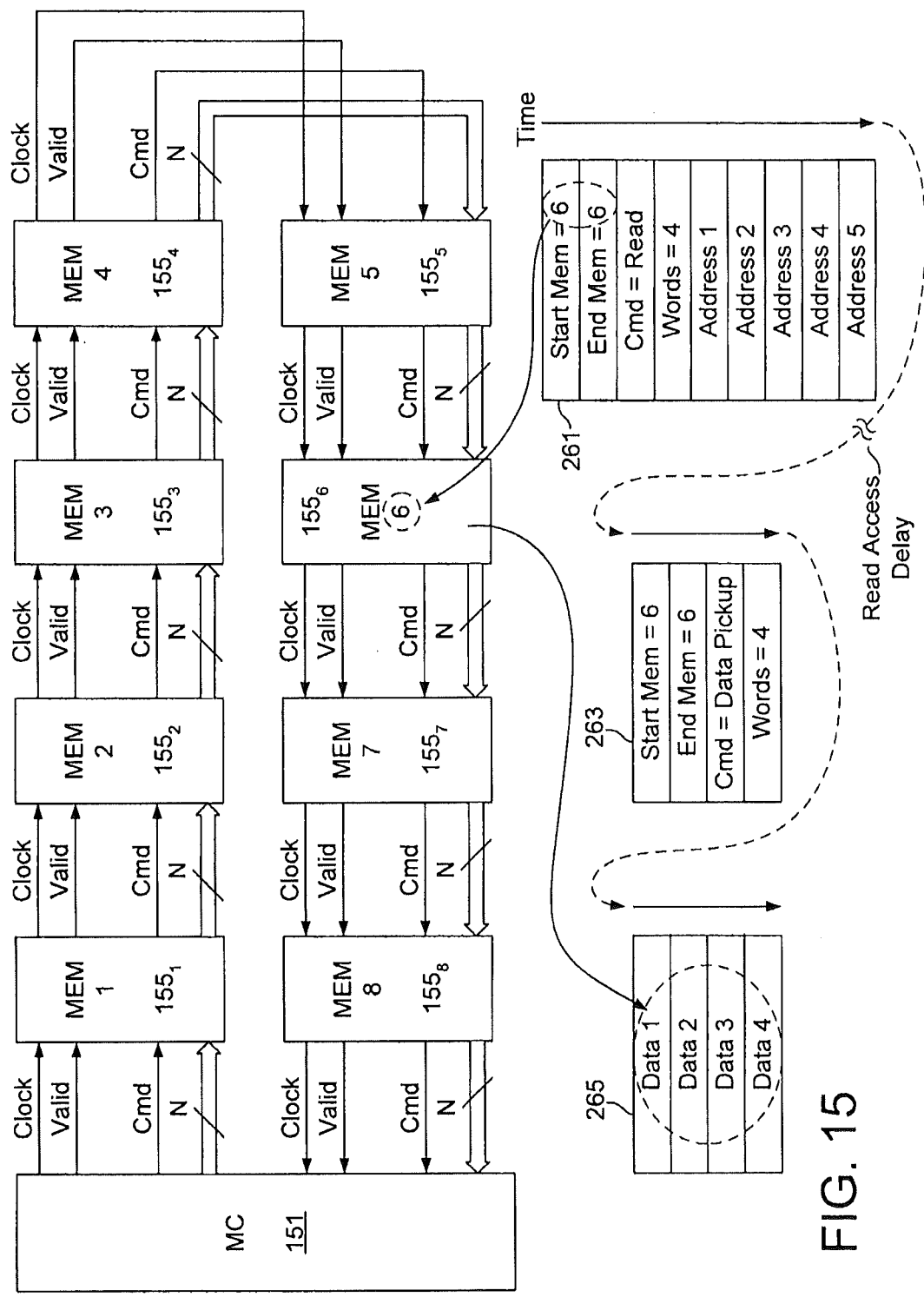
FIG. 15 illustrates an exemplary data read operation directed to a single memory device within the memory system of FIG. 5A.

FIG. 15 illustrates an exemplary data read operation directed to memory device 1556 within the memory system 150 of FIG. 5A. Initially, the memory controller 151 outputs a memory read command 261 having device selectors that specify device 1556, a command specifier that indicates a data read operation, a word count that specifies the number of data words to be read (four in this example, though more or fewer words may be read, depending on the maximum burst length of the memory device), and an address value (specified by five address words in this example) that specifies a starting memory address within the storage array of memory device 1556. Memory device 1556 determines itself to be targeted by the read command, and responds by retrieving data words from the storage locations indicated collectively by the starting memory address and the word count, and by buffering the retrieved data words within an output buffer. The data retrieval operation requires a minimum access time as specified in the parameter information for the target memory device.

After transmitting the read command 261, the memory controller 151 delays for a period referred to herein as the read access delay (according to the minimum access time information stored in the parameter database for the target memory device), then issues a data shuttle command 263 indicating that four data words are to be output onto the signaling queue by memory device 1556. The memory device responds to the data shuttle command 263 by transmitting a data packet 265 that includes the retrieved data words (i.e., the data words within the output buffer) onto the signaling queue immediately following the re-transmission of the data shuttle command. The data shuttle command with appended data packet propagates through the remaining memory devices of the memory chain (i.e., memory devices 1557 and 1558) to the memory controller, thus concluding the read operation initiated by transmission of the read command 261.

Figure 16:
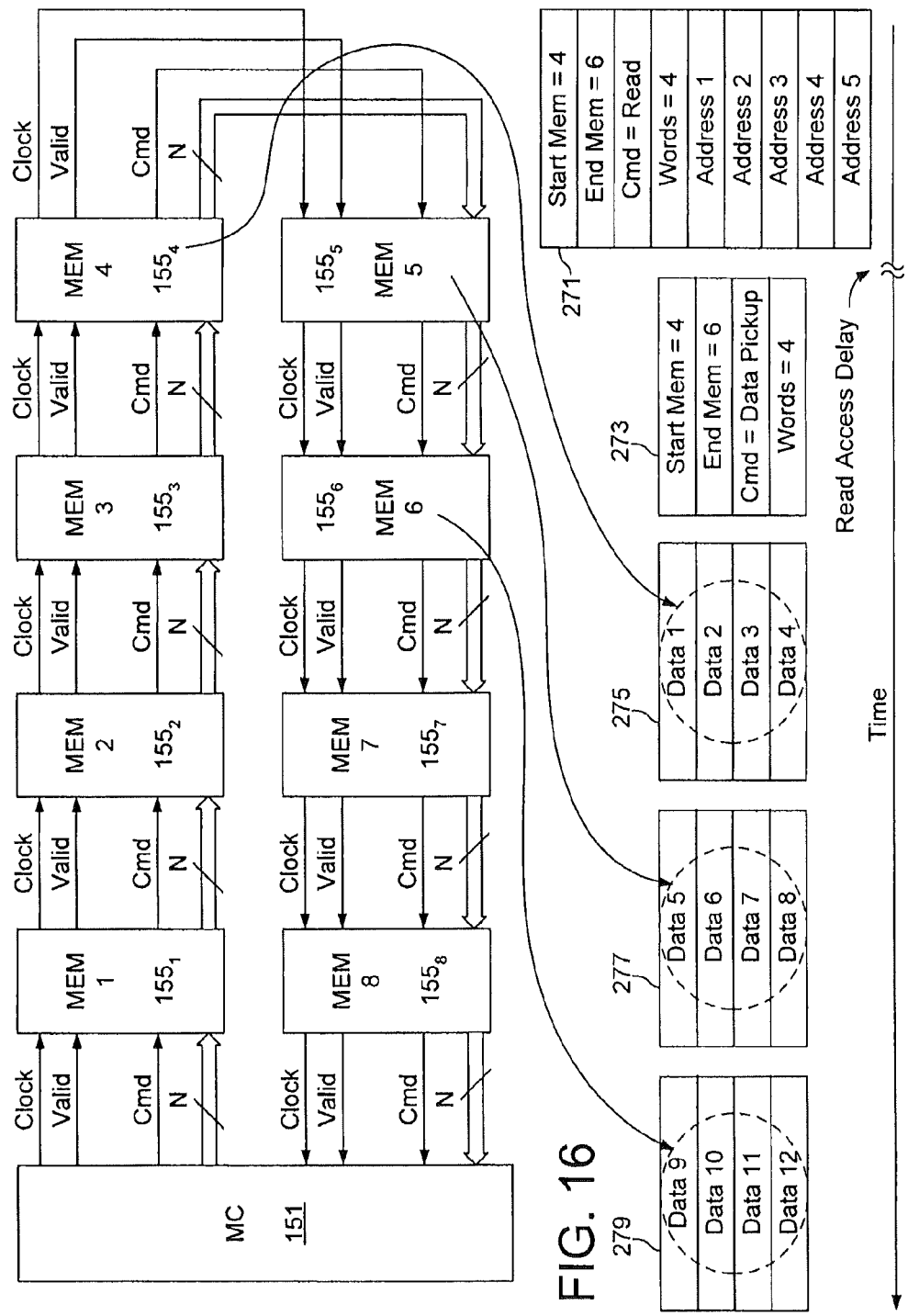
FIG. 16 illustrates an exemplary data read operation directed to a range of memory devices within the memory system of FIG. 5A.

FIG. 16 illustrates an exemplary data read operation directed to a target range of memory devices 1554-1556 within the memory system 150 of FIG. 5A. Initially, the memory controller 151 outputs a memory read command 271 having device selectors that specify the target range, a command specifier that indicates a data read operation, a word count that specifies the number of data words to be read from each memory device in the target range (four words in this example), and an address value that specifies a starting memory address within the storage array of each memory device in the target range. In alternative embodiments, different starting address values and/or different word counts may be specified for each memory device 155 in the target range.

Each of the target memory devices 1554-1556 responds to the read command by retrieving data words from the storage array locations indicated collectively by the starting memory address and the specified number of data words, and buffering the retrieved data words within the output buffer of the memory device. After issuing the read command 271, the memory controller 151 delays for the minimum time required for each of the target memory devices 1554-1556 to retrieve the requested data (i.e., the longest of the access times recorded for the three memory devices), then issues a data shuttle command 273 instructing the target memory devices 1554-1556 to output the retrieved data. The first target memory device, 1554, responds to the data shuttle command 273 by retransmitting the data shuttle command 273 then transmitting a data packet 275 containing buffered read data values 1-4 onto the signaling queue, in effect appending the data packet 275 to the end of the data shuttle command 273 (i.e., consuming the transmit intervals immediately following retransmission of the data shuttle command). The second target memory device, 1555, retransmits the data shuttle command 273 and the appended data packet 275, then transmits a data packet 277 containing buffered read data values 5-8 onto the signaling queue. The third target memory device, 1556, similarly retransmits the data shuttle command and the appended data packets 275 and 277, then transmits a data packet 279 containing buffered read data values 9-12 onto the signaling queue, thus completing the data shuttle. The data shuttle command 273 and appended data packets 275, 277 and 279 (i.e., containing data words 1-12) propagate through the remaining memory devices in the memory chain to reach the memory controller, thereby completing the memory operation initiated by issuance of the read command 271.

Still referring to FIG. 16, it should be noted that multiple data shuttle commands may be issued to the target memory devices 1554-1556 instead of the single data shuttle command 273. For example, if the access time of memory device 1554 is significantly shorter than the access time of memory devices 1555 and 1556, the memory controller may issue a first data shuttle command to pick up data from memory device 1554, then one or more additional data shuttle commands to pick up data from longer-access-time memory devices 1555 and 1556.

Memory Device Embodiments

Figure 17:
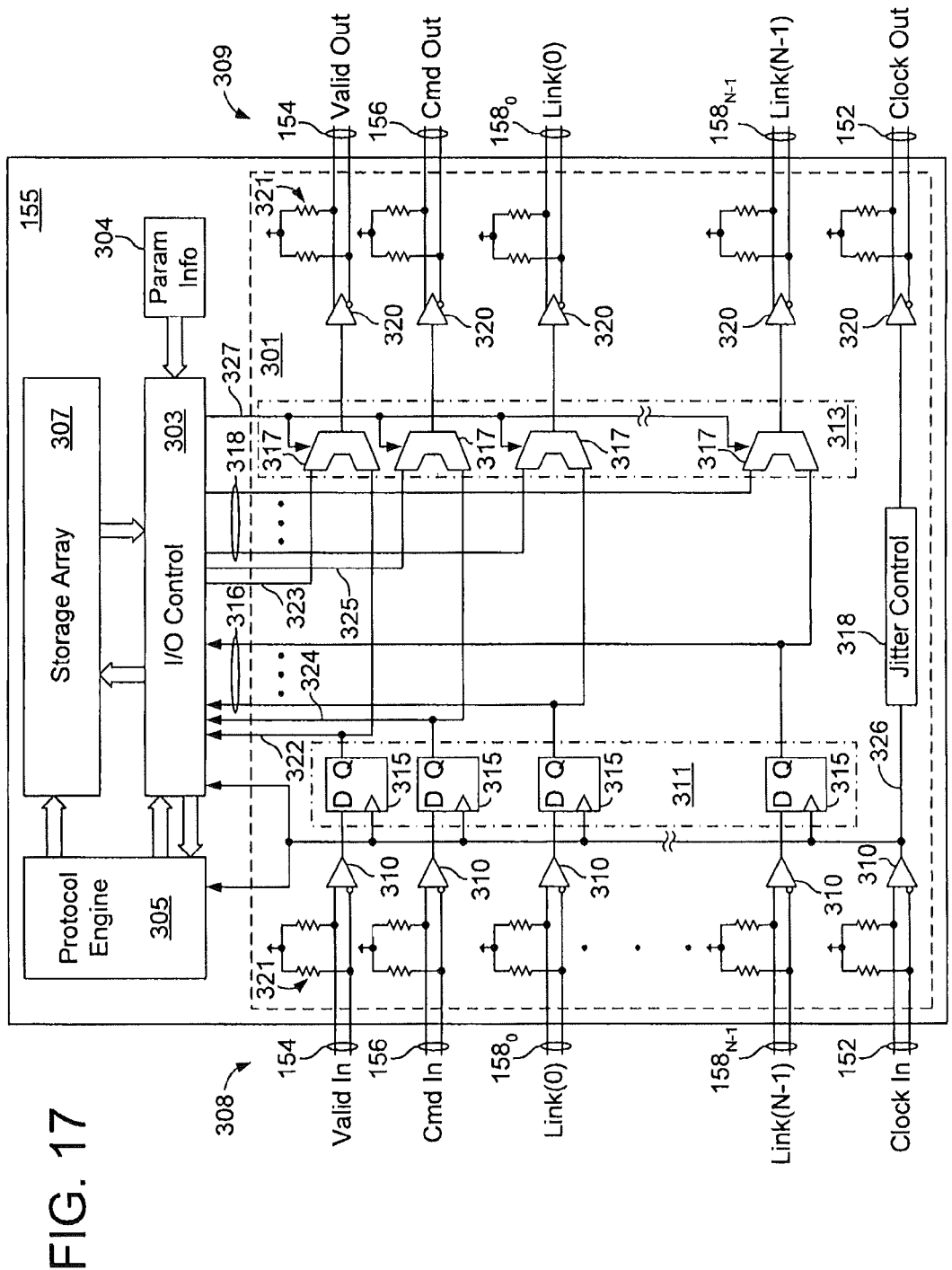
FIG. 17 is a block diagram of a memory device according to an embodiment of the invention.

FIG. 17 is a block diagram of a memory device 155 according to an embodiment of the invention. The memory device 155 is divided into two distinct sections: a high-speed interface and a memory storage structure. The high-speed interface is designed to work seamlessly with the incoming and outgoing point-to-point links and operates at the clock rate provided in the incoming link clock signal. The memory storage structure includes the actual storage array 307 (which may include multiple sub-arrays) and protocol processing.

The high-speed interface is formed by I/O circuitry 301, I/O controller 303 and protocol engine 305. The I/O circuitry 301 includes a bank of differential receivers 310 coupled to a signal-input interface 308 of the memory device 155, an interface register 311 coupled to outputs of the differential receivers 310, a select circuit 313 coupled to outputs of the interface register 311, and a bank of differential output drivers 320 having inputs coupled to outputs of the select circuit 313 and outputs coupled to a signal-output interface 309 of the memory device. The signal-input interface 308 includes interconnection structures (e.g., pins or other contacts and corresponding signal path segments) to couple inputs of the differential receivers 310 to the differential signal lines 152, 154 and 156 that carry the incoming clock, valid and command signals, respectively, and the differential signal lines 1580-158N–1 that constituent the input-side bus. The signal-output interface 309 similarly includes interconnection structures to couple the differential output drivers 320 to the differential signal lines 152, 154 and 156 that carry the outgoing clock, valid and command signals, respectively, and the different signal lines 1580-158N–1 that constitute the output-side bus. In the embodiment of FIG. 17, on-chip termination elements 321 are coupled to each of the interconnection structures of the signal-input interface 308 and the signal-output interface 309, thereby providing double-ended termination of each differential, point-to-point link between a pair of memory devices 155 (or between a memory device and a memory controller). Alternatively, single-ended termination may be provided. Also, such termination elements 321 may be provided off-chip, for example, by discrete component connections to printed wire traces that form the point-to-point signaling links, or by other off-chip termination structures.

Figure 18B:
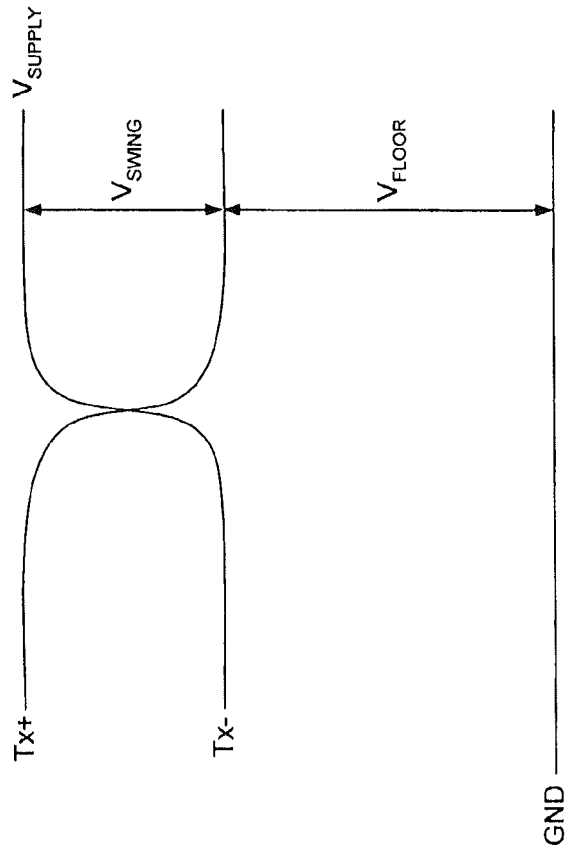
FIG. 18B illustrates an exemplary output signal waveform generated by the current mode logic driver of FIG. 18A.
Figure 18A:
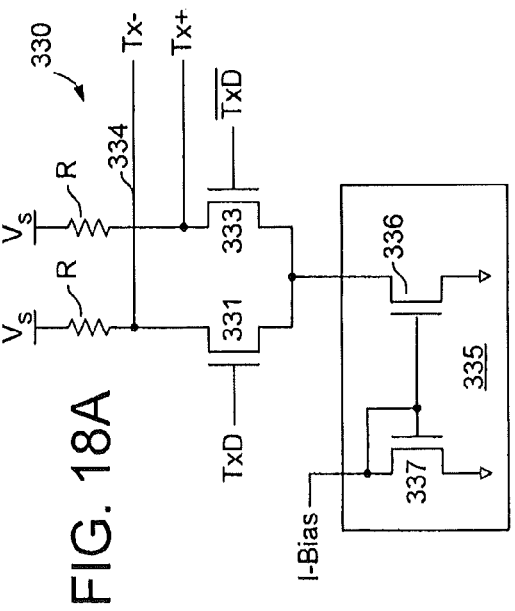
FIG. 18A illustrates an embodiment of a current mode logic driver that may be used to implement the differential output drivers of FIG. 17.

In one embodiment, each of the differential output drivers 320 is a current mode logic (CML) driver that pulls down one line or the other within the pair of pulled-up signal lines that form a differential signaling line. FIG. 18A, for example, illustrates a CML driver 330 that may be used to implement the differential output drivers 320 of FIG. 17. The CML driver 330 includes transistors 331 and 333 having drains coupled to respective termination elements (depicted as resistors, R, in FIG. 18A, though active load elements may be used) and that form differential output nodes 332 (Tx+) and 334 (Tx−). The source terminals of transistors 331 and 333 are coupled to one another and to a biasing circuit 335 that controls the current drawn through the termination elements, and therefore the voltage swing generated at the differential output nodes 332 and 334. In the embodiment of FIG. 18A, the biasing circuit 335 includes a biasing transistor 336 coupled in a current-mirror configuration with a diode-configured transistor 337. By adjusting the voltage at the drain of the diode-configured transistor 337 (a control signal designated "I-Bias" in FIG. 18A), the current through transistor 337 may be increased or decreased to achieve a desired, proportional increase or decrease in the bias current drawn by biasing transistor 336, and thereby calibrate the signal swing of the CML driver 330 to a desired amplitude. FIG. 18B illustrates an exemplary output signal waveform generated by the CML driver 330 of FIG. 18A. When the a logic '1' value is to be transmitted, the transmit data value (TxD) and complement transmit data value (/TxD) applied to the gates of transistors 331 and 333, are '1' and '0', respectively. Consequently, transistor 331 is switched on to conduct most or all of the bias current established by the biasing circuit 335 and therefore pulls output node 334 down according to the voltage drop across the corresponding termination element. At the same time, transistor 333 is switched off (or to a conduction state that conducts a smaller current than that conducted by transistor 331) so that output node Tx+ is pulled up to a level at or near the supply voltage, VS. By this operation, a small-swing differential signal is generated at the output nodes 332 and 334 (and therefore on the outgoing differential signal line) with the amplitude of the swing being established by the bias current through transistor 336. In a specific embodiment, the supply voltage is approximately one volt, and the swing amplitude is 200 millivolts (e.g., established by a ~4 mA bias current drawn through a 50 ohm termination element). Thus, as shown in FIG. 18B, the low end of the signal swing occurs at voltage floor (VFLOOR) 800 mV above a system ground reference. Different supply voltage levels, voltage swings and voltage floors may be used in alternative embodiments. Also, other types of output drivers may be used in alternative embodiments, including self-biasing output drivers, push-pull output drivers and so forth.

Referring again to FIG. 17, the differential receivers 310 may be implemented by circuits similar to the CML driver 330 of FIG. 18A, except that the constituent signal lines of an incoming differential signal line are coupled to the gate terminals of the transistors 331 and 333 and the drain nodes of transistors 331 and 333 are coupled to a logic level converter to generate a logic level output. Other receiver circuits may be used in alternative embodiments.

In one embodiment, a logic level clock signal 326 is generated by the signal receiver 310 coupled to the input-side clock line 152 and is supplied to the protocol engine 305, I/O controller 303 and interface register 315. The clock signal 326 is additionally provided to the output driver 320 coupled to the output-side clock line 152 to drive the outgoing clock signal. A jitter control circuit 318 may optionally be provided to reduce jitter accumulation on the clock signal as it propagates from memory device to memory device. In one embodiment, the interface register 311 includes edge-triggered storage elements 315 (e.g., D flip-flops) coupled to outputs of the differential receivers 310 and having strobe inputs coupled to receive the clock signal 326 to capture signals generated by the differential receivers 310 at each rising edge and falling edge of the clock signal 326. In one implementation, such double-data rate capture is achieved by providing a first set of storage elements 315 to capture outputs of the differential receivers 310 in response to each rising edge of the clock signal 326, and a second set of storage elements 315 to capture outputs of the differential receivers 310 in response to a falling edge of the clock signal 326 (or in response to a rising edge of a complement of the clock signal 326). Other circuits may be used to capture data on both edges of the clock signal in alternative embodiments, and, as discussed above, more or fewer than two signal samples per clock cycle may be captured in the interface register.

The logic-level signals captured within the interface register 311 include a valid-in signal 322, command-in signal 324 and set of N data-in signals 326 (which may represent data or command words) and are supplied to the I/O controller 303 and select circuit 313 for one transmit interval before being overwritten with an incoming set of signals. In a full-retransmit embodiment, the I/O controller 303 deasserts a select signal 327, thereby enabling the select circuit 313 to pass the registered contents of the interface register 311 to the output drivers 320 for retransmission via the egress interface 309. By contrast, in the partial-retransmit embodiment described above, the I/O controller 303 may selectively retransmit write data according to whether the write data is to be stored within the memory device. In such an embodiment, the I/O controller 303 may deassert a valid-out signal 323 and assert the select signal 327 (thus supplying the deasserted valid-out signal 323 instead of the asserted valid-in signal 322 to the output driver 320) to prevent retransmission of selected write data values, thereby signaling an idle transmit interval (i.e., no transmission) to the downstream memory device.

The I/O controller 303 buffers commands and data received from the interface register 311 in command and data buffers, respectively, in accordance with the state of the valid and command signals. The I/O controller 303 outputs buffered commands to the protocol engine 305 which, in response, issues control signals to the storage array 307 (e.g., to control, read, write, erase, refresh and other operations according to the type of storage array) and control signals to the I/O controller 303 to enable transfer of write and read data between the storage array 307 and input and output data buffers within the I/O controller 303, and to enable transfer of parameter data from the parameter storage 304 to an output buffer of the I/O controller 303. The I/O controller 303 supplies buffered output data to the output drivers 320 via the select circuit 313, asserting or deasserting the select signal 327 in each transmit interval to select either the output of the interface register 311 or buffered output data to be supplied to the output drivers 320 for transmission on the signaling queue. In the embodiment of FIG. 17, the select circuit 313 includes a set of multiplexers 317 each having a first input coupled to a respective output of the interface register 311 (i.e., to the output of a respective storage element 315), a second input coupled to receive a respective bit of a buffered data word from the I/O controller 303, and an output coupled to a respective one the output drivers 320. The select signal 327 is provided to a select input of each of the multiplexers 317 so that the select circuit 313 outputs either the content of the interface register 311 or a buffered data word from the I/O controller 303 according to the state of the select signal 327.

Reflecting on the memory device architecture shown in FIG. 17, it should be noted that the high-speed interface (i.e., formed by I/O circuitry 301, I/O controller 303 and at protocol engine 305) or any portion thereof may be implemented in an IC that is distinct from the IC containing the storage array 307 and associated control circuitry. While increasing the total IC count in the memory system, such an approach enables the high-speed interface and the storage array 307 to be fabricated using different processes.

Figure 19:
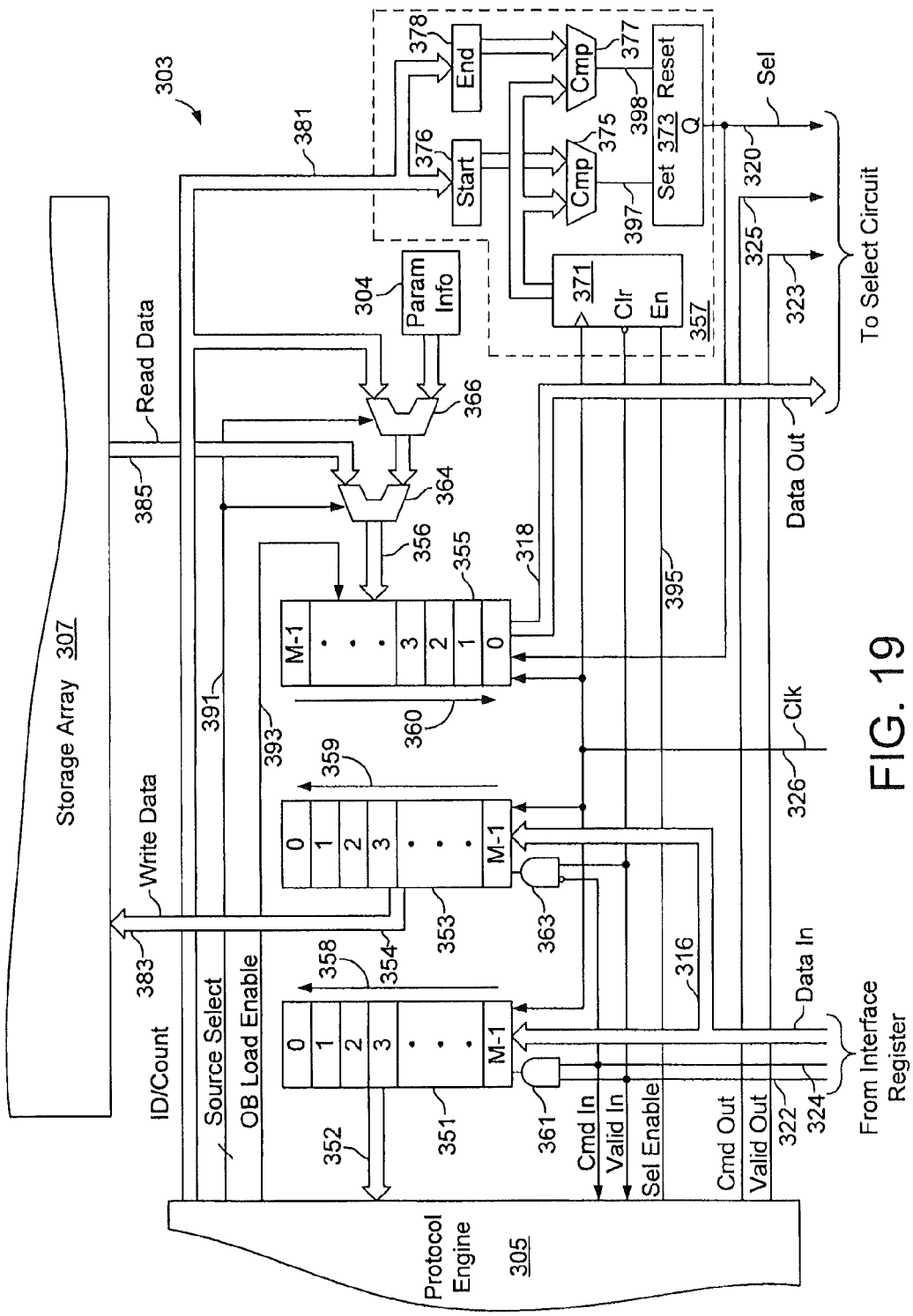
FIG. 19 illustrates the input/output (I/O) controller of FIG. 18 according to an embodiment of the invention.

FIG. 19 illustrates the I/O controller 303 of FIG. 17 and its interconnection to the protocol engine 305, storage array 307 and I/O circuit 301 according to an embodiment of the invention. The I/O controller 303 includes a command buffer 351, input data buffer 353 and output buffer 355, as well as logic AND gates 361 and 363, multiplexers 364 and 366, and select logic 357. The input data buffer and command buffer are first-in-first-out (FIFO) storage structures used to buffer data packets and command packets, respectively. Data packets and command packets are loaded from the interface register into the input data buffer 353 and command buffer 351, respectively, one word at time in response to transitions of the clock signal 326. In one embodiment, the command buffer size is fixed according to the command protocol (e.g., at least deep enough to hold a long-form command packet), and the input data buffer size is determined according to the number of data packets the memory device 155 is designed to store in response to one or more write requests. Alternatively, the command buffer 351, input data buffer 353 and/or output buffer 355 may be formed by a shared storage array, with storage elements allocated to the different buffers according to commands received within the memory device 155. The logic AND gates 361 and 363 are coupled to receive the valid-in and command-in signals 322 and 324 and are used to selectively enable data words and command words to be loaded into the input data buffer 353 and command buffer 351, respectively. More specifically, when the valid-in signal 322 and command-in signal 324 both go high (or remain high), the output of logic AND gate 361 goes high to enable a corresponding command word to be loaded into command buffer 351 (i.e., via the data-in signal lines 316), shifting all other command words forward within the command buffer 351 in the direction shown by arrow 358. When the valid-in signal 322 is high and the command-in signal is low, a data word has been captured in the interface register and is presented on the data-in signal lines 316. In that circumstance, the output of logic AND gate 363 goes high to enable the data word to be loaded into input data buffer 353, shifting all other data words forward within the input data buffer 353 in the direction shown by arrow 359.

The protocol engine 305 inspects command words loaded into the command buffer 351 to determine whether the memory device 155 is a target of the incoming command (e.g., whether the device ID of the memory device 155 is specified by the starting and ending selectors or mask selector) and, if so, whether the command is a long-form or short-form command. After the final word of a command targeting the memory device 155 is loaded into the command buffer 351, the entire command is transferred to the protocol engine 305 in a broadside transfer (e.g., a parallel transfer) via command path 352, thus freeing the command buffer 351 to receive subsequent commands while the command transferred to the protocol engine 305 is carried out. In the case of a write command, the corresponding write data packet (or write data packets) is received by the I/O circuit and loaded one data word at a time into the input data buffer 353. After the command-specified number of data words have been loaded into the input data buffer 353, the entire write data packet is transferred to the storage array 307 in a broadside transfer via write data path 383. The write data packet may be transferred to a page buffer other holding register of the storage array 307 prior to being stored therein, or may be transferred directly to an addressed row of memory cells within the storage array 307. Also, instead of a broadside transfer to the storage array 307, the constituent data words of a write data packet may be transferred one at a time to the storage array 307, or in groups of data words until the entire data packet has been transferred.

In the embodiment of FIG. 19, the output buffer 355 is used to construct data packets to be output onto the signaling queue, including packets of read data, parameter information and initialization information. The output buffer size may be fixed according to the burst length of the memory device or, as discussed above, may vary according the availability of a shared storage. Multiplexers 364 and 366 respond to source select signals 391 from the protocol engine 305 to select either the storage array 307, protocol engine 305 or parameter storage 304 to source the data loaded into the output buffer 355. More specifically, during initialization, the protocol engine 305 is selected to load initialization information (e.g., the value of a device identifier or incremented device identifier) into the output buffer 355 via load path 381. When responding to a parameter query command, the parameter storage 304 is selected to load parameter information into the output buffer 355, and when responding to a data read command, the storage array 307 is selected to load read data into the output buffer 355. In the embodiment of FIG. 19, the protocol engine 305 asserts an output-buffer load enable signal 393 to enable a broadside load of parameter information, read data or initialization information into the output buffer 355. Alternatively, data may be loaded into the output buffer 355 one word at a time or in groups of words.

The select logic 357 includes an output counter 371, start count register 376, end count register 379, comparators 375 and 377, and S-R (set-reset) flip-flop 373. The output counter 371 includes a strobe input coupled to receive the clock signal 326, a clear input (Clr) coupled to receive the valid-in signal 322, and an enable input (En) coupled to receive a select enable signal 395 from the protocol engine 305. In one embodiment, when the valid-in signal 322 is deasserted, the count value maintained within the output counter 371 is cleared (e.g., to zero), arming the output counter for the next data output operation. To support this operation, the memory controller maintains assertion of the valid signal for a predetermined number of transmit intervals following issuance of a data pickup command, thereby enabling the target memory device (or devices) to output the requested data before the output counter 371 is cleared. In an alternative embodiment, the protocol engine 305 may issue a separate control signal to clear the output counter 371 at the appropriate time. When a data read command, parameter query command or other command requiring data output is received, the protocol engine 305 manages the loading of the output buffer 355 (i.e., generating the source select signals 391 and output buffer load enable signal 393 as described above). The protocol engine 305 additionally outputs start count and end count values to the start count register 376 and end count register 378, respectively, to specify a range of transmit intervals during which the contents of the output buffer 355 are to be driven onto the signaling queue. When the protocol engine 305 receives a data pickup command (e.g., a data shuttle command or a parameter query command) from the command buffer 351, the protocol engine 305 asserts the select enable signal 395 to enable the output counter to begin counting transitions of the clock signal 326. Comparator 375 receives the count value from the output counter 371 and the start count from the start count register 376 at respective inputs and asserts a control signal 397 to the set input of the S-R flip-flop 373 when the count value meets or exceeds the start count. The S-R flip-flop 373, in response, asserts the select signal 327 which is supplied to the I/O circuit to select the output buffer 355 to source data (i.e., via data output path 318) to be output onto signaling queue. The protocol engine 305 generates the valid-out signal 323 and command-out signal 325 which are driven onto the valid-out and command-out lines of the signaling queue to round out the outgoing transmission.

Still referring to FIG. 19, the select signal 327 is additionally provided to a shift-enable input of the output buffer 355 to enable the contents of the output buffer to be advanced after each transmit interval. By this arrangement, the contents of the output buffer 355 are output onto the signaling queue one word after another in respective transmit intervals. Comparator 373 receives the count value from the output counter 371 and the end count from the end count register 378 at respective inputs and asserts a control signal 398 to the reset input of the S-R flip-flop 373, thereby resetting the S-R flip-flop 373 and deasserting the select signal 327 when the count value exceeds the end count. Thus, the start and end count values inclusively define the range of transmit intervals during which values are shifted out of the output buffer 355 onto the signaling queue. For example, when a data pickup command (or a portion thereof) is detected by the protocol engine 305, the protocol engine 305 may program a start count and end count within start and end count registers 376 and 378, respectively, according to the position of the memory device 155 within a group of memory devices targeted by the data pickup command. Referring to FIG. 16, for example, the programmed start count and end count values for memory device 1554 are zero and three to enable the data packet 275 to be transmitted in the first four transmit intervals following retransmission of the data shuttle command 273. By contrast, the programmed start count and end count values for memory device 1555 are four and seven to enable device 1555 to transmit data packet 277 in the first four transmit intervals following retransmission of the data packet 275. Following the same pattern, the programmed start count and end count values for memory device 1556 are eight and eleven to enable device 1556 to transmit data packet 279 in the first four transmit intervals following retransmission of the data packet 277. Note that all start and end count values may be offset as necessary to account for the latency between assertion of the select enable signal 395 and retransmission of the final command word of the data shuttle command or other data pickup command.

Figure 20:
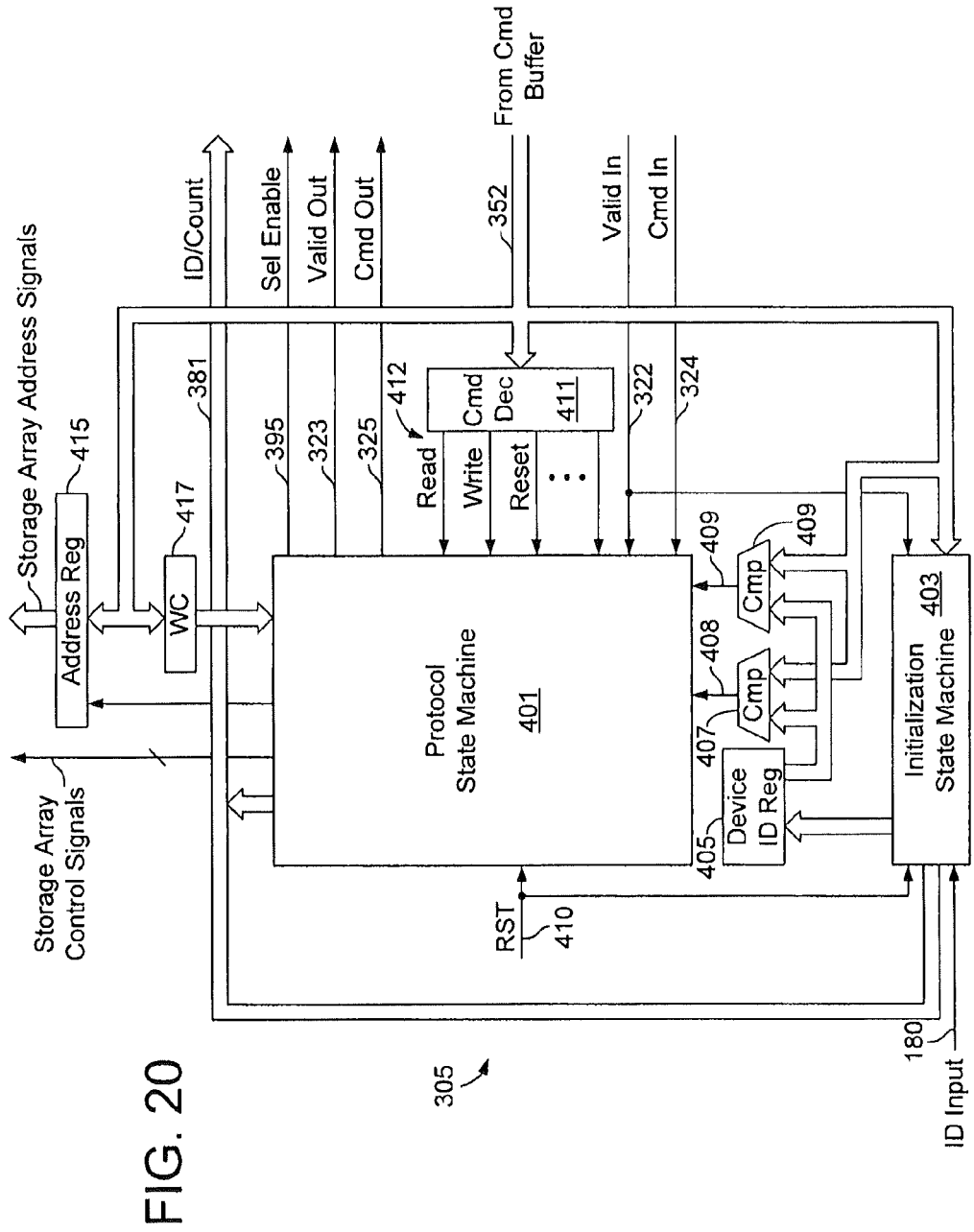
FIG. 20 illustrates a protocol engine 305 according to an embodiment of the invention.

FIG. 20 illustrates a protocol engine 305 according to an embodiment of the invention. The protocol engine 305 includes a protocol state machine 401, initialization state machine 403, command decoder 411, device ID register 405, ID comparators 407 and 409, address register 415 and word count register 417. The valid-in signal 322 is supplied to the protocol state machine 401 and initialization state machine 403 to indicate when valid data and command values have been captured in the interface register (the command-in signal 324 being provided to the protocol state machine 401 to distinguish between data and command inputs) and, though not specifically shown, the clock signal received from the upstream device is additionally provided to the protocol state machine 401 and initialization state machine 403 to enable synchronized state transitions. In an alternative embodiment, a separate clock signal (received from an external source or generated internally) may be used to clock the protocol state machine 401 and/or initialization state machine 403. Also, the clock signal received from the upstream device may be subdivided or otherwise used to provide a lower frequency clock signal to the protocol state machine 401 and initialization state machine 403.

The initialization state machine 403 is coupled to the command buffer (i.e., element 351 of FIG. 19) via command path 352 and is coupled to receive a reset signal 410 (RST), the device ID input 180 and, as discussed, the valid-in signal 322. The initialization state machine 403 is additionally coupled to the output buffer (i.e., element 355 of FIG. 19) via load path 381 and the multiplexers 366 and 364 described in reference to FIG. 19. When the reset signal 410 is asserted (e.g., during device power-up), the initialization state machine 403 is reset to an initial state and remains in the initial state until the valid-in signal 322 is asserted. When the valid-in signal 322 is asserted, the initialization state machine 403 inspects the device ID input 180 to determine whether the host memory device (i.e., the memory device containing the protocol engine 305) is the initial memory device in a chain. If the device ID input 180 indicates that the host memory device is the initial memory device in a chain, the initialization state machine loads a predetermined device ID value into the memory ID register 405 (e.g., device ID='1'). If the device ID input 180 indicates that the host memory device is not the initial memory device in a chain, the initialization state machine 403 obtains a device ID value from the command buffer and, in an embodiment in which the upstream device increments the device ID, records the device ID value in the device ID register 405. The initialization state machine 403 then increments the device ID (e.g., by adding or subtracting a predetermined value, or by left or right shifting, or other manipulation) and outputs the incremented device ID to output buffer via load path 381. The protocol state machine 401 then manages transmission of the incremented device ID to the downstream memory device by programming appropriate start and end count values within the I/O controller 303 (i.e., with the start and end count registers 376 and 378 of FIG. 19) and by asserting the select enable signal 395 and the valid-out signal 323. In an embodiment in which each memory device transmits its own device ID to the downstream memory device, the initialization state machine 403 increments the incoming device ID before loading the device ID into the device ID register 405, then outputs the incremented device ID to the command buffer for transmission to the downstream memory device.

In the embodiment of FIG. 20, the device ID register 405 outputs the device ID to the ID comparators 407 and 409 which, in turn, compare the device ID with start and end device selectors received via the command path 352. More specifically, ID comparator 407 receives the start device selector and asserts a first in-range signal 408 if the start device selector is less than or equal to the device ID. ID comparator 409 receives the end device selector and asserts a second in-range signal 410 if the end device selector is greater than or equal to the device ID. Thus, if the device ID is within the inclusive range of device IDs specified by the start and end device selectors, both in-range signals 408 and 410 are asserted, signaling the protocol state machine 401 that the host memory device is targeted by the command presented on command path 352. Note that the protocol engine 305 may include a command register (not shown in FIG. 20) to store the command received via command path 352 and thereby free the command buffer to be loaded with a subsequent command.

The command decoder 411 is coupled to receive incoming commands via the command path 352 (or from a command register) and includes combinatorial logic to assert one of a number of decoded command signals (e.g., individual signals each indicating a different one of the set of possible commands) according to the command specifier. Thus, for each command received via command path 352, the protocol state machine 401 is informed whether the command is directed to the host memory device and is informed of specific command to be executed (e.g., read, write, reset, erase, refresh, power-mode, parameter query, data shuttle, etc.).

In the embodiment of FIG. 20, the protocol state machine 401 takes no action if the command is not directed to the host memory device (i.e., the host memory device is not a target of the command), thereby allowing the command to be overwritten within the command buffer (or command register) by the next command issued by the memory controller. In an alternative embodiment, the protocol state machine 401 may issue a flush signal to the I/O controller 303 to clear the content of the command buffer. If the command is directed to the host memory device, the protocol state machine 401 issues the appropriate signals to the storage array, address register 415, and I/O controller (i.e., signals 395, 323, 325) to carry out the specified command. More specifically, in the case of a long-form command packet (e.g., commanding a read, write, erase or other operation that includes an address value), the protocol state machine 401 asserts an address load signal to the address register 415 to enable the address value included within the command to be loaded into the address register 415. The address register 415, in turn, outputs corresponding address signals to the storage array. The word count value provided in the command (i.e., the number of words to be read, written, erased, etc.) is stored in the word count register 417 and provided to the protocol state machine 401 to enable the protocol state machine 401 to determine the number of times to advance address value stored within the address register 415. For example, if the word count value indicates that eight words are to be read from the storage array (128 bits total) and loaded into a 16-bit wide output buffer (i.e., element 355 of FIG. 19), and that the output word size of the storage array is 32 bits (i.e., size of the data value read from each addressable storage location is 32 bits), then the protocol state machine 401 will advance the address register three times (number of words to be read (8) divided by the ratio of storage array word size to buffer word size (32/16), minus one) to obtain the requested data. When a read, write, erase, refresh or other command that requires operation within the storage array is received, the protocol state machine 401 issues the appropriate control signals to the storage array to carry out the command. For example, in the case of a memory read command, the protocol state machine 401 issues a read enable signal to initiate a data retrieval operation within the storage array (i.e., starting at or encompassing the address loaded into the address register 417). In the case of a memory device having a page buffer, the protocol state machine 401 may issue different control signals at different times depending on whether the read address provided in the command hits or misses the open memory page (i.e., the memory page stored in the page buffer). The protocol state machine 401 also asserts valid-out signal 323 and command-out signal 325 for transmission on the signaling queue along with retransmitted commands and asserts the valid-out signal for transmission on the signaling queue with retransmitted data and data transmissions sourced by the host memory device.

Still referring to FIG. 20, if the protocol state machine 401 detects assertion of the valid-in signal 322 and command-in signal 324 in conjunction with a data pickup signal from the command decoder 411 (i.e., indicating that a data pickup command has been received) and device selectors that encompass or otherwise specify the device ID stored in the device ID register, the protocol state machine 401 determines the appropriate transmission interval for data output (e.g., according to the position of the host memory device within a group of target memory devices) and issues corresponding start count and end count values to the start and end count registers of the I/O controller via load path 381. The protocol state machine 401 additionally asserts the select enable signal 395 to enable the output counter (i.e., element 371 of FIG. 19) to begin counting transmit intervals. By this operation, the protocol state machine 401 controls the timing of data transfer from the output buffer to the signaling queue, thereby enabling the contents of the output buffer to be transmitted immediately after retransmission of a corresponding data pickup command, or after any number of transmit intervals necessary to enable data transmissions from upstream target memory devices to be retransmitted.

Memory Controller Embodiments

Figure 21:
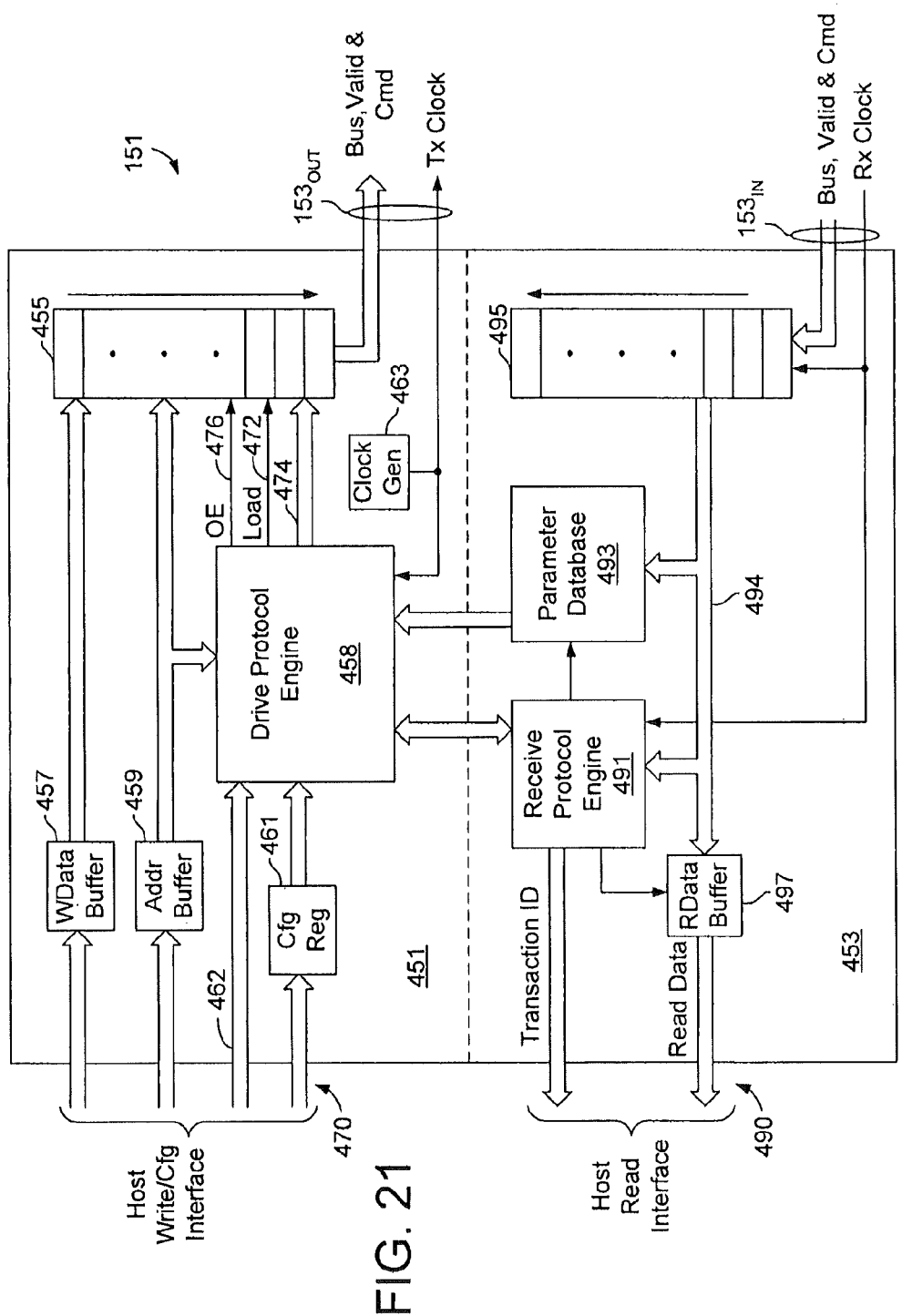
FIG. 21 illustrates the memory controller of FIG. 5A according to an embodiment of the invention.

FIG. 21 illustrates the memory controller 151 of FIG. 5A according to an embodiment of the invention. The memory controller 151 includes chain driver circuitry 451 and chain receiver circuitry 453, each having an interface to the memory chain and an interface to a host device (or multiple host devices). More specifically, the chain driver 451 includes a host request interface 470 to receive memory access requests and configuration commands from a host device, and a memory drive interface 153OUT to output signals to the initial memory device in the chain (e.g., valid and command signals, clock signal, and bus signals). The chain driver 151 also includes a write data buffer 457, address buffer 459 and configuration register 461 coupled to the host request interface 470, an output buffer 455 and clock generator 463 coupled to the memory drive interface 153OUT, and a drive protocol engine 458 coupled to the host request interface 470 to receive memory access requests (i.e., via path 462), and to the address buffer 459, clock generator 463 and output buffer 455.

The chain receiver 453 includes a memory receive interface 153IN coupled to receive the valid, command, clock and bus signals from the final memory device in the chain, and a host read interface 490 to provide read data and a corresponding transaction ID to the host device. As discussed below, the transaction ID is a value used to associate a read request received via the host request interface 470 with read data returned via the host read interface 490. The chain receiver 453 also includes an input buffer 495 in which incoming packets are assembled, and a parameter database 493, receive protocol engine 491 and read data buffer 497 all coupled to a broadside output of the input buffer 495. The receive protocol engine 491 outputs the transaction ID to the host read interface 490, and controls the transfer of read data from the input buffer 495 to the read data buffer 497. The receive protocol engine 491 is also coupled to the drive protocol engine 458 to enable coordination of transmissions on the signaling queue and to enable association of transaction IDs and read requests. The parameter database 493 is used to store device parameters obtained in response to parameter query commands issued by the chain driver 451, and is coupled to provide device parameter information to the drive protocol engine 458. The drive protocol engine applies the parameter information in synthesizing command packets and data packets within the output buffer 455 to carry out host access requests, memory maintenance operations (e.g., refresh control operations, power mode control) and other memory system control functions.

At device power up, the host device issues configuration information to the memory controller 151 which is stored in the configuration register 461 and thereafter provided to the drive protocol engine 458. The configuration information may include any information useful to establish the operating parameters of the memory system including, without limitation, information describing the width and/or depth of data words or packets to be transferred between the host device and memory controller 151, the handshaking protocol to be used, if any, for transfers between the memory controller 151 and host device, error checking and/or correction to be carried out by the memory controller 151 (e.g., whether error code correction (ECC) information is to be included in data stored within the memory and used for automatic error correction), information specifying a clock rate to be used on the signaling queue, clock domain crossing information (e.g., establishing the respective clock rates to be used in host domain and memory controller domain), power control information indicating when and/or under what circumstances memory devices within the memory chain are to be placed in or restored from lower power modes, and so forth.

Referring specifically to the chain driver 451, the write data buffer 457 and address buffer 459 are coupled to the host request interface and used to store the write data and write address, respectively, that form part of a host write request. The write data may include any number of data values in any width, according to the physical arrangement of the host request interface 470 and write data buffer 457, and the configuration information stored within the configuration register. The write data may also include mask information for masking selected portions of the write data (i.e., preventing the selected portions from being written within the memory chain). The write address identifies, directly or indirectly, the memory chain storage locations in which the write data is to be stored and may be a physical or logical address. Write addresses may be translated as necessary (e.g., by the drive protocol engine 458 or other address translation circuitry) to determine a target memory device or group of target memory devices within the memory chain, and one or more storage locations within the target memory device or target group of memory devices, such information being used to determine the device selector and address words of a memory write command constructed within the output buffer 455.

In the embodiment of FIG. 21, the clock generator 463 is used to drive the clock line of the point-to-point link to the initial memory device (i.e., the memory drive interface 153OUT) and is used to clock the drive protocol engine 458 (e.g., to clock one or more state machines within the drive protocol engine 458). In alternative embodiments, different clock generators may be used to drive the outgoing clock line and to control the operation of the drive protocol engine 458. Also, while an on-chip clock generator 463 is shown (e.g., a voltage controlled oscillator alone or in a phase-locked loop), an external clock source may also be used (e.g., a crystal oscillator or other off-chip timing source).

When a write request is received, the drive protocol engine 458 synthesizes a long-form write command within the output buffer. More specifically, the drive protocol engine 458 determines the target memory device or group of memory devices indicated by the write address, generates a corresponding device selector value (e.g., start and end device selectors, a mask selector or other value that identifies the target memory devices) and loads the device selector value into the output buffer to as part of command construction within the buffer. The drive protocol engine 458 additionally constructs a write command specifier, count value (i.e., indicating the number of data words to be written), and address value (i.e., based on the address value stored in the address buffer) and loads these values into the output buffer to complete a long-form command having the exemplary format shown in FIG. 10. In one embodiment, the drive protocol engine 458 also enables the write data stored in the write data buffer to be transferred into the output buffer in a broadside load. Alternatively, the drive protocol engine 458 enables the write data to be streamed into the output buffer one data word at a time, or in groups of data words. In either case, the drive protocol engine 458 determines an appropriate time to begin transmission of the write command on the signaling queue and asserts an output enable signal 476 to enable command buffer to output the write command and write data onto the signaling queue, one word at a time. In one embodiment, the output buffer 455 is wide enough to accommodate the data and command words, and additionally to store valid and command bits that are used to drive the valid and command signals. In such an embodiment, the valid and command bits are set for the command words that constitute the long-form write command, and the valid bit only is set for the ensuing data words (i.e., the command bit is reset to signal data transfer). In an alternative embodiment, the drive protocol engine 458 directly drives the valid and command signal lines, asserting both valid and command signals during command packet transfer and asserting the valid signal only during data packet transfer.

When a read request is received, the drive protocol engine 458 constructs a long-form read command within the output buffer 455, including start and end selector values (or a selector mask or other selector values), a read command specifier, and a word count value indicating the number of words to be read from each of the target memory devices. The drive protocol engine 458 then asserts the output enable signal 476 to enable the read command to be transmitted on the signaling queue. The drive protocol engine 458 additionally determines the read access latency of the target memory devices based on device parameter information recorded in the parameter database 493 and based on prior accesses to the devices. For example, in one embodiment, the drive protocol engine 458 maintains an open page list that indicates the open pages within individual memory devices of the memory chain. Upon receiving a read request, the drive protocol engine 458 determines whether the read address falls within an open page of a target memory device and, if so, obtains an open-page access time from the parameter database 493 for the target memory device. After appropriate read access time values have been obtained for each of the memory devices targeted by the read command, the drive protocol engine 458 schedules one or more data pickups in accordance with configuration information stored within the configuration register. More specifically, in one embodiment, the configuration register may be programmed to effect a bifurcated data pickup by the memory controller if certain conditions are met (e.g., if a data access hits the open page in one target memory device and misses the open page in another target memory device, or if a difference in read access latencies for respective target memory devices exceeds a programmed threshold). As an example, upon receiving a read command that targets two different memory devices, and determining that the read address hits an open page in one of the memory devices and not the other, the chain driver 451 may issue separate data shuttle commands to the target memory devices, thereby returning data from the page-hit memory device earlier than would otherwise occur if all data was picked up by a single data shuttle command. The drive protocol engine 458 may also issue other long-form and short-form commands to the memory chain including, as discussed above, parameter query commands, refresh commands, erase commands, power mode control commands (e.g., to place devices in one or more low power modes, or to restore devices to normal operating modes), reset commands and so forth. The drive protocol engine 458 also includes circuitry to time the transmission of command and data packets onto the signaling queue such that one or more commands may be issued over the signaling queue in the intervening time interval between issuance of a read command and a data shuttle command. Also, the drive protocol engine 458 may reorder command issuances relative to the order received via the host request interface 470 according to programmed priorities. For example, upon receiving a write request followed by a read request, the drive protocol engine 458 may issue the corresponding commands in reverse order (i.e., issuing the read command before the write command) to reduce read latency. The drive protocol engine 458 may also combine commands, for example, by issuing a refresh command with the data pickup bit set so that the resulting command effects a data pickup operation and commands the target memory devices to perform refresh operations.

Referring to the chain receiver circuitry 453, commands and data that propagate through the signaling queue eventually arrive at the memory receive interface and are loaded into the input buffer 495. In one embodiment, the clock signal received from the final memory device (or a derivative thereof) is used to strobe data and command words into the input buffer 495. The clock signal (or derivative clock signal) may also be provided to the receive protocol engine 491 to clock one or more state machines therein. Alternatively, a clock signal generated by the clock generator 463 may be used to control the operation of the receive protocol engine 491 and other circuit blocks within the chain receiver circuitry.

When a command (or at least part of a command) is received within the input buffer 495, the receive protocol engine 491 determines whether the command is a data pickup command and, if so, enables the data packets which follow to be loaded into the parameter database 493 or the read data buffer 497, depending on whether parameter information or read data was picked up. In one embodiment, data packets are loaded into the input buffer 495 and transferred to the read data buffer 497 via a broadside output port of the input buffer 495 so that one or more entire data packets are transferred into the read data buffer 497 in a single transfer. Alternatively, data words are streamed from the input buffer 495 to the read data buffer 497 one word after another (or one group of words after another). Parameter information may similarly be transferred to into the parameter database in packets or streamed into the parameter database in words or groups of words. In one embodiment, the drive protocol engine 458 receives a transaction ID with each read request received via the host interface (or assigns a transaction ID), and communicates the transaction ID to the receive protocol engine 491 for output with the associated read data via the host read interface 490.

Still referring to FIG. 21, in one embodiment, access time values are stored within the parameter database 493 in units that represent the absolute access time of the corresponding memory devices (e.g., values that indicate device access times in nanoseconds or picoseconds). To determine the appropriate number of transmit intervals to transpire before issuing a data pickup command (e.g., the number of transmit intervals to wait after issuance of a read command before issuing a corresponding data shuttle command), the drive protocol engine 458 obtains the appropriate access time value from the parameter database 493 and multiplies the access time value by the link signaling rate (e.g., recorded as a number of transmit intervals per unit time). By this operation, the number of transmit intervals to transpire before issuance of a data pickup command is automatically scaled as the link signaling rate is adjusted up or down. This is particularly useful in an embodiment in which the memory controller is configured to dynamically adjust the link signaling rate in response to detection of signaling errors on the signaling queue. In an alternative embodiment, access time values are recorded in the parameter database in units of transfer intervals, according to the link signaling rate in effect when the parameter database 493 is populated. In such an embodiment, the memory controller 151 may automatically revise the access time values when the link signaling rate is adjusted.

Command Sequencing

Figure 22A:
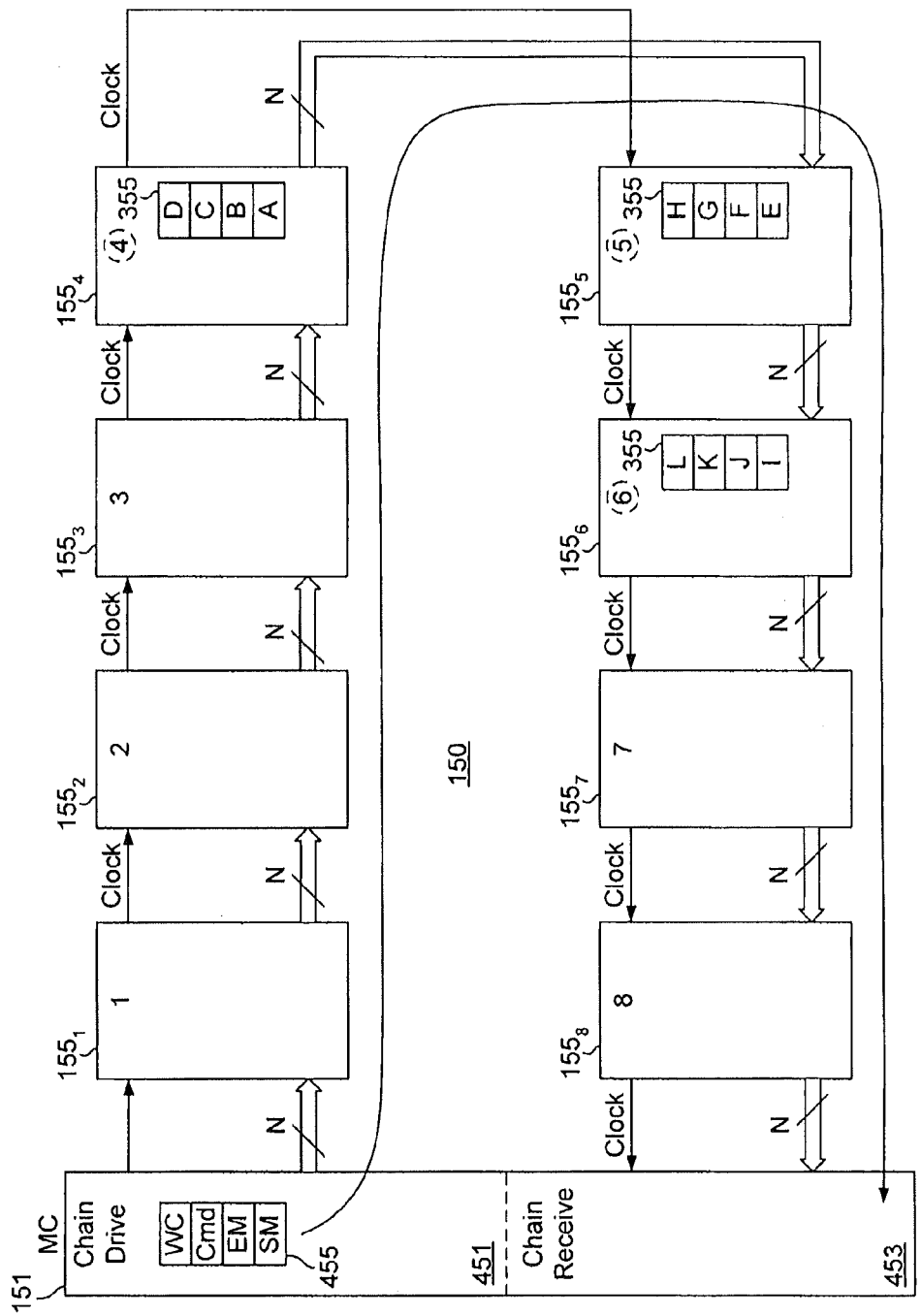
FIGS. 22A-22F illustrate issuance of a data pickup command and ensuing data write command within a memory system according to an embodiment of the invention.

FIGS. 22A-22F illustrate issuance of a data pickup command and ensuing data write command within a memory system 150 according to an embodiment of the invention. Referring first to FIG. 22A, a read command requesting that four data words be read from memory devices 1554, 1555 and 1556 has previously been issued, and the corresponding data words loaded into output buffers 355 of the target memory devices. That is, data words A, B, C and D have been loaded into the output buffer 355 of memory device 1554; data words E, F, G and H have been loaded into the output buffer 355 of memory device 1555; and data words I, J, K and L have been loaded into the output buffer 355 of memory device 1556. The memory controller 151 has loaded its output buffer 455 with a data shuttle command having start memory and end selectors that specify memory devices 1554-1556 (i.e., SM=4, EM=6), a data shuttle command specifier (CMD) and a word count value that specifies four words to be picked up from each of the target memory devices (i.e., WC=4).

Figure 22B:
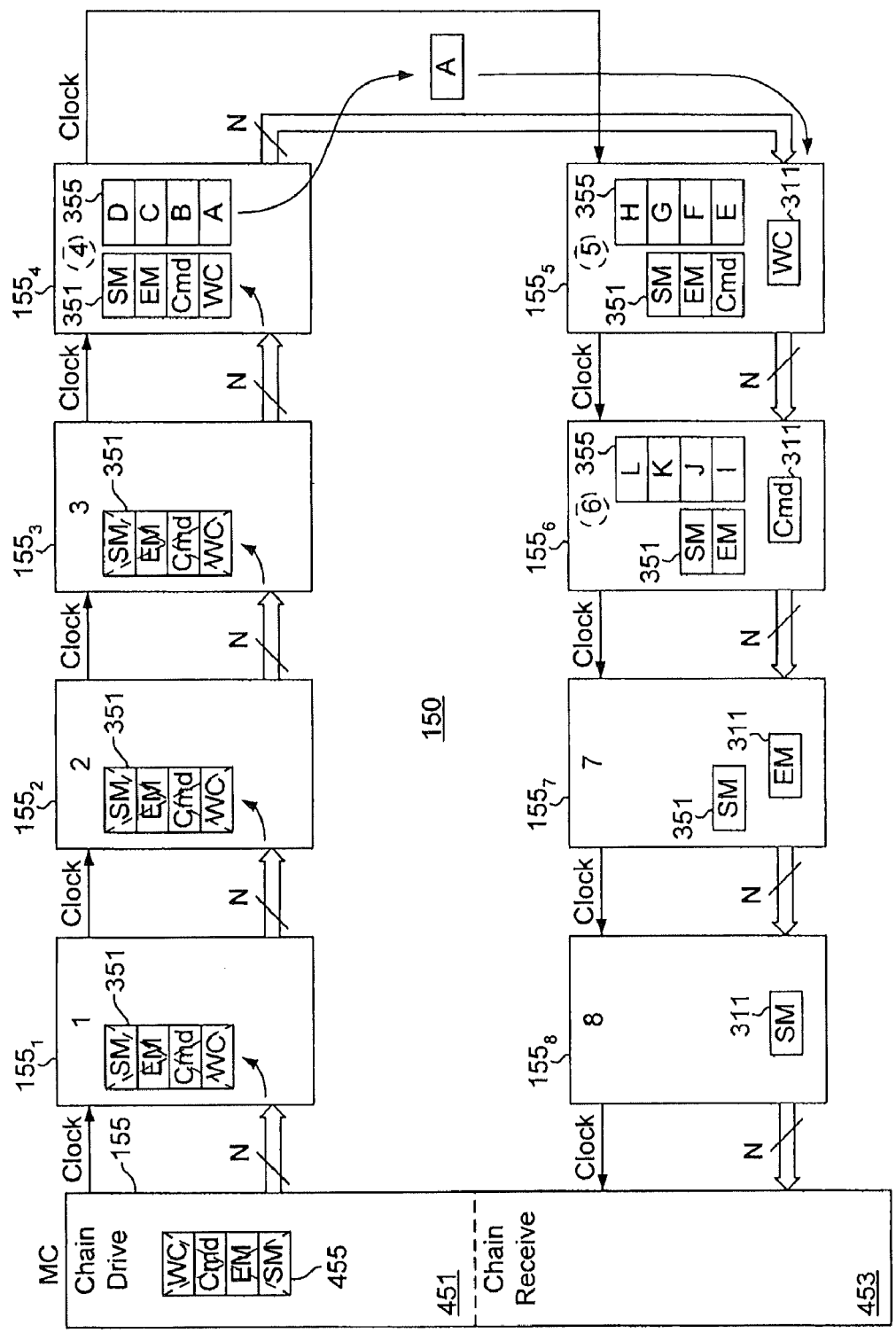

FIG. 22B illustrates the condition of the memory system 150 after the data shuttle command has propagated part of the way through the signaling queue. More specifically, the first command word of the data shuttle command (the start selector in the exemplary protocol of FIGS. 22A-22F) has been captured within the interface register 311 of memory device 1558 and loaded into the command buffers 351 of upstream memory devices 1551-1557. Similarly, the second command word (the end selector) has been captured in the interface register 311 of memory device 1557 and loaded into the command buffers 351 of upstream memory devices 1556-1551; the third command word (the command specifier) has been captured within the interface register of memory device 1556 and loaded into the command buffers 351 of memory devices 1555-1551; and the fourth command word (the word count value) has been captured within the interface register of memory device 1555 and loaded into the command buffers 351 of memory devices 1554-1551. Thus, the full data shuttle command has been loaded into the command buffers 351 of memory devices 1554-1551.

In one embodiment, the memory controller 151 flushes each command and data packet from the output buffer as it is transmitted on the signaling queue. This operation is indicated in FIG. 22B by the 'X' through the memory controller output buffer 455. Similarly, each memory device 155 that has received at least the start and end selectors and determined itself not to be targeted by the command may flush the command from the command buffer as indicated by the 'X' through the command buffers of memory devices 1551-1553. The command may also be flushed from the command buffer of target memory devices 1554-1556 after being transferred to the protocol engine of the memory device (i.e., element 305 of FIG. 18).

Memory device 1554, upon determining itself to be the first memory device in the target group of devices, begins outputting read data values A, B, C and D in the first transmit interval following retransmission of the data shuttle command. Thus, in the instant shown in FIG. 22B, data word A is output onto the point to point link between memory devices 1554 and 1555, to be stored in the interface register of memory device 1555 during the subsequent transmit interval.

Figure 22C:
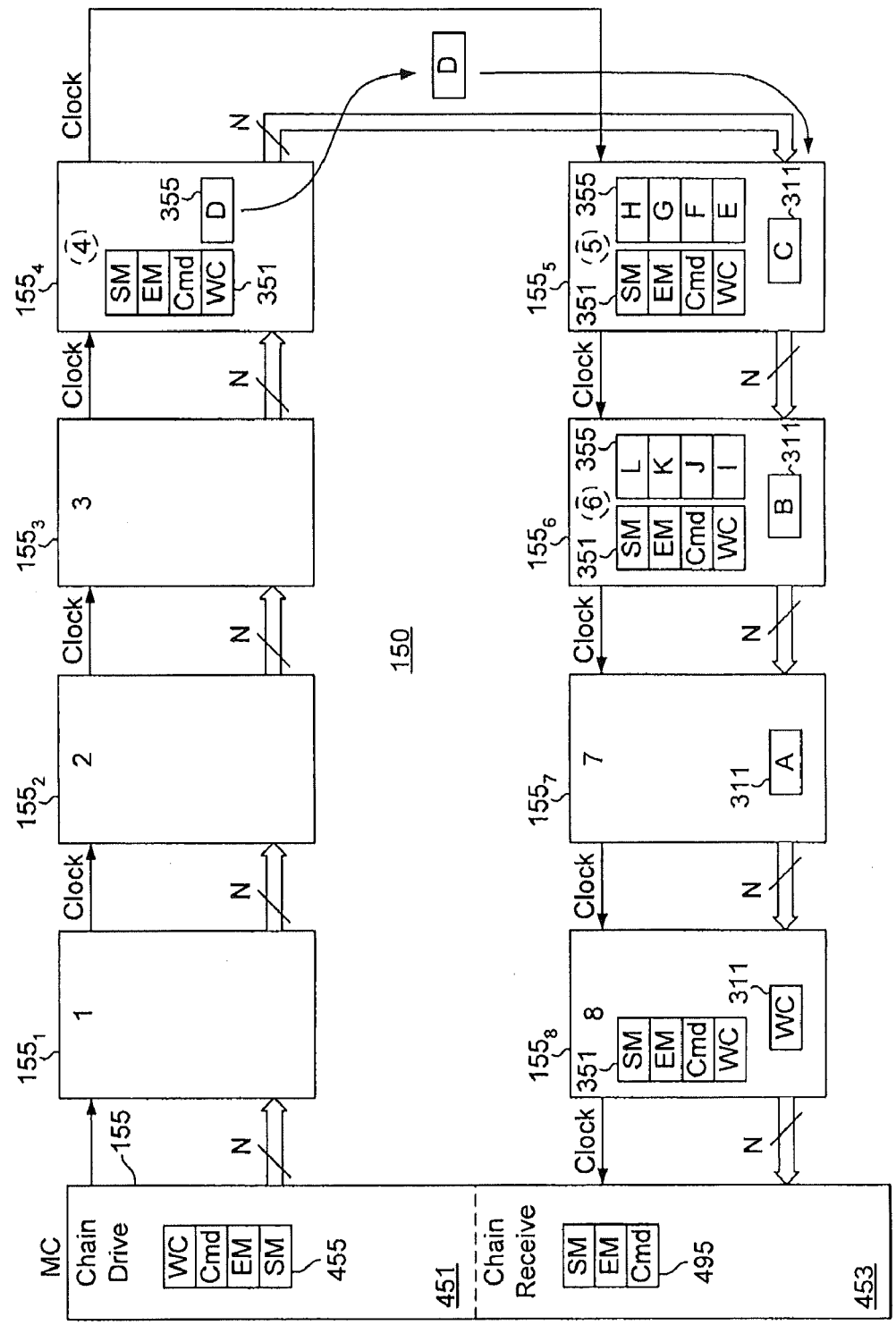

FIG. 22C illustrates the condition of the memory system 150 after the device selectors, SM and EM, and the command specifier of the data shuttle command have propagated through the signaling queue and have been stored in the input buffer 495 of the memory controller 151. At this point, the word count value has been captured within the interface register of memory device 1558 and will be transmitted to the memory controller 151 in the next transmit interval to complete the transmission of the data shuttle command through the signaling queue. Memory devices 1551-1553 and 1557 have received the data shuttle command and determined themselves not to be targeted by the command, and therefore have flushed their command buffers. Memory device 1558 will flush its command buffer 351 in the next transmit interval, when the data shuttle command is fully assembled within the command buffer 351 and transferred to the protocol engine. As discussed above, the data shuttle command may alternatively remain in the command buffer of the non-targeted memory devices 155 until overwritten by subsequent commands.

Still referring to FIG. 22C, data words A, B and C have been output by memory device 1554 and are propagating toward the memory controller 151 one transmit interval behind the data pickup command. Thus, data word A is stored in the interface register 311 of memory device 1557, data word B is stored in the interface register 311 of memory device 1556 and data word C is stored in the interface register 311 of memory device 1555. Data word D is being output from memory device 1554 to memory device 1555 so that, in the next transmit interval, the output buffer of memory device 1554 will be completely empty, with data words A, B, C and D stored in the interface registers 311 of memory devices 1558, 1557, 1556 and 1555, respectively.

Figure 22D:
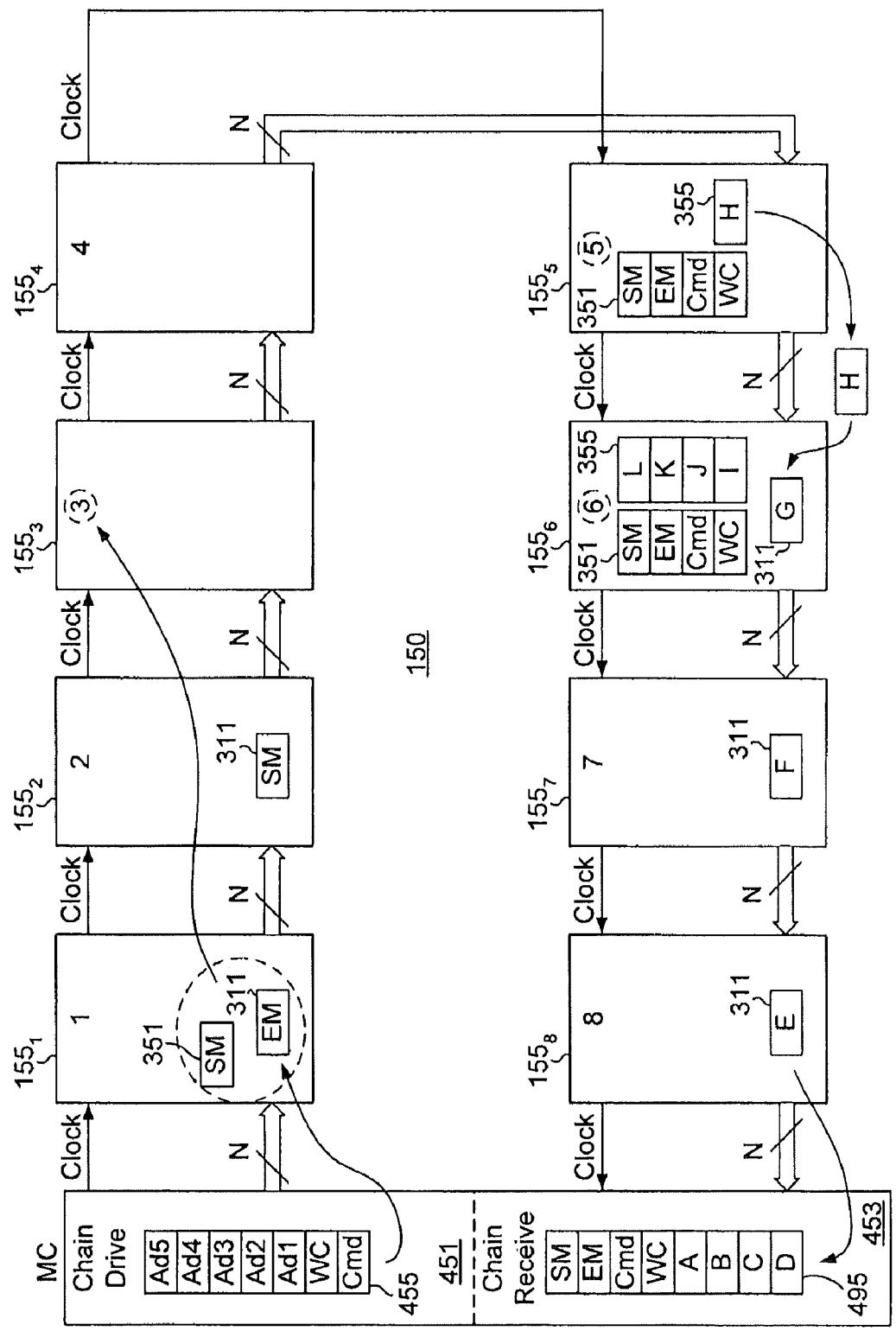

FIG. 22D illustrates the condition of the memory system 150 as memory device 1555 transmits the last of the read data words (H), from its output buffer 355 onto the signaling queue, and as a new long-form command, directed to memory device 1553, is transmitted on the signaling queue by the memory controller 151. Data words E, F and G were transmitted by memory device 1555 in previous transmit intervals (i.e., immediately following retransmission of data word, D, from memory device 1554) and are stored in the interface registers 311 of memory devices 1558, 1557 and 1556, respectively. As shown, the complete data shuttle command and four data words output by memory device 1554 have been received within the input buffer 495 of the memory controller 151. Also, memory device 1554 has flushed its command buffer after transmission of the data words A-D.

The start selector of the long-form command has been stored in the interface register 311 of memory device 1552 and in the command buffer 351 of memory device 1551, and the end selector has been stored in the interface register of memory device 1551. Thus, even as the final data values requested by the data shuttle command continue to be output on the signaling queue (and propagate toward the memory controller 151), a new command is issued onto the signaling queue by the memory controller 151.

Figure 22E:
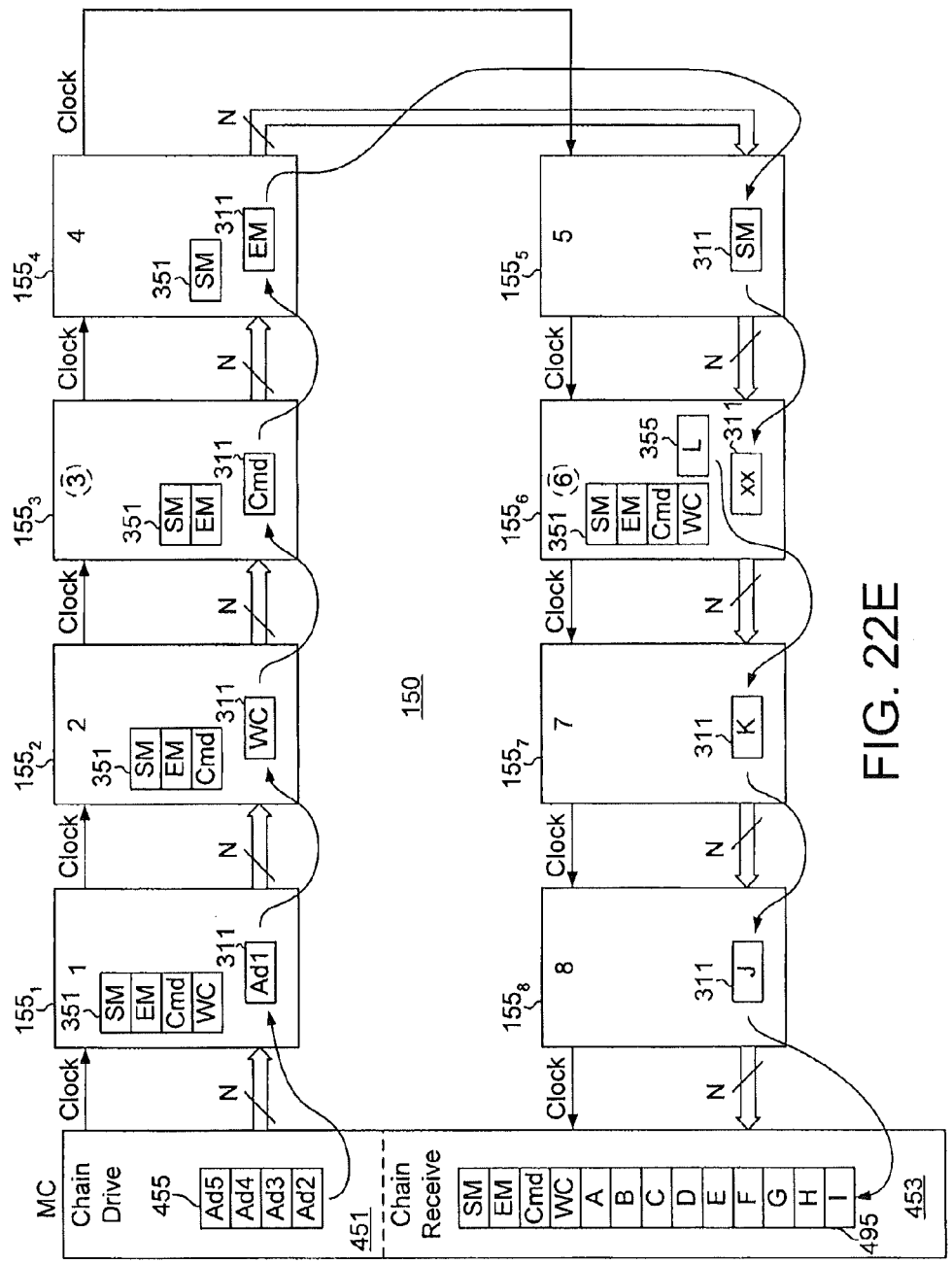

FIG. 22E illustrates the condition of the memory system 150 as memory device 1556 outputs the last of the read data words (L), from its output buffer 355 onto the signaling queue, and as the long-form command continues to be entered onto the signaling queue by the memory controller 151. Data words I, J and K were transmitted by memory device 1556 in previous transmit intervals (i.e., immediately following retransmission of data word, H, from memory device 1555) and are stored, respectively, in the input buffer 495 of the memory controller 151 and the interface registers 311 of memory devices 1557 and 1558. The long-form command continues to be received within the command buffers 351 of the memory devices 155.

As shown, the first command word in the long-form command (the start selector, SM) is being output from the interface register 311 of memory device 1555, concurrently with the output of data word L by memory device 1556. Thus, the signaling queue is fully loaded with no unused transmit intervals between transmission of the data shuttle command and the long-form command. This result is achieved because the memory controller 151 is aware of the number of transmit intervals consumed on the queue by the data shuttle command (a deterministic function of the total number of command and data words being returned to the memory controller 151 and the number of hops between the memory controller 151 and the target memory device furthest downstream) and therefore may time the transmission of the long-form command so that the command propagates through the signaling queue one transmit interval behind the final data value output in response to the data shuttle command.

Figure 22F:
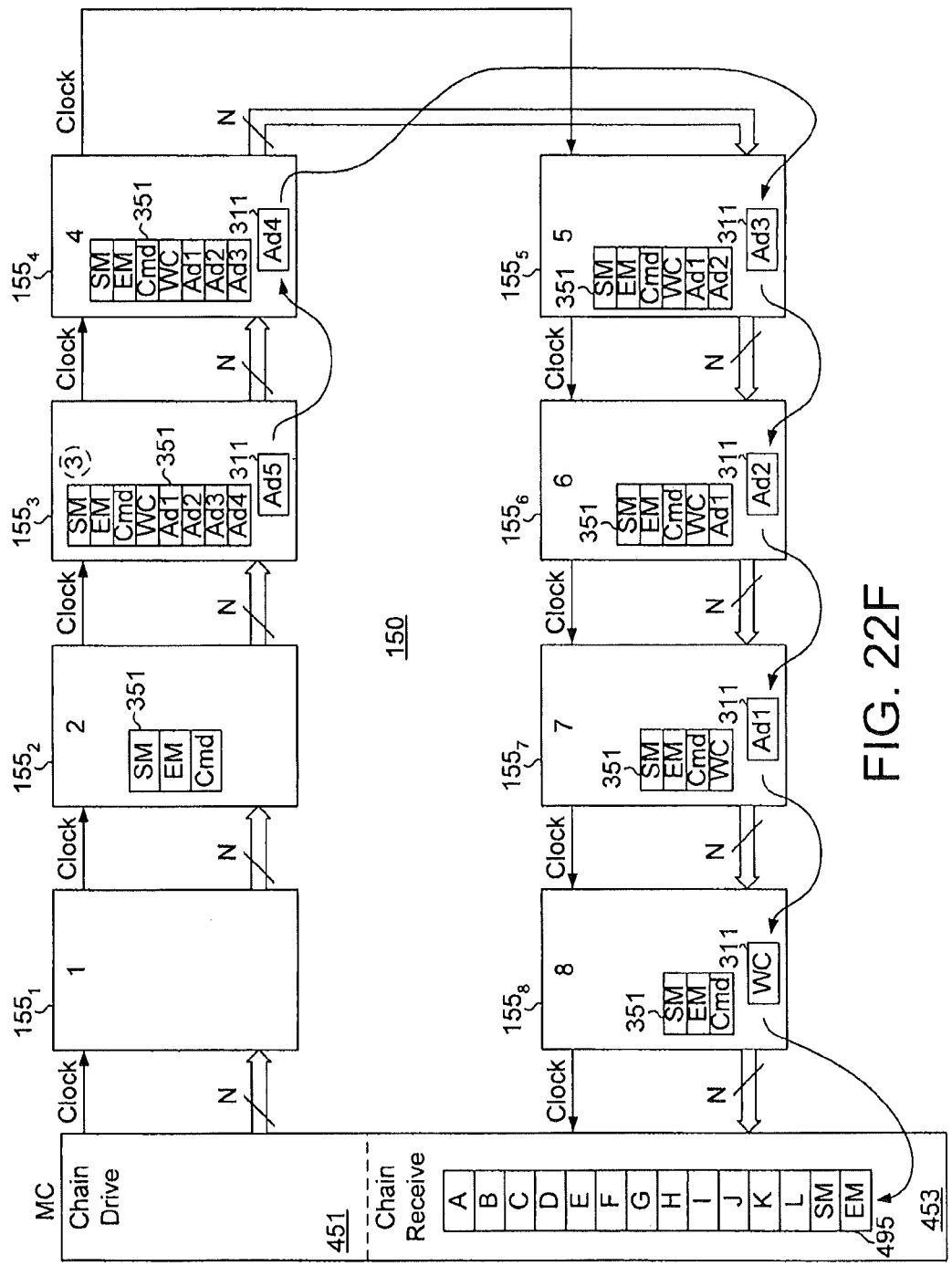

FIG. 22F illustrates the condition of the memory system 150 after all the data requested by the data shuttle command has been buffered within the input buffer 495 of the memory controller 151 and as the long-form command continues to propagate through the memory chain and be loaded into the command buffers 351 of the memory devices 155. Memory devices 1551 and 1552 have determined themselves not to be targets of the long-form command and have therefore flushed the command from their command queues. The target memory device 1553 has received the final address word in its interface register 311 and will begin carrying out the requested action in subsequent transmit intervals. The long-form command will propagate through the remaining devices, being flushed from the command buffer of each upon determination that the command is directed to device 1553 only.

Memory Module Embodiments

Figure 23:
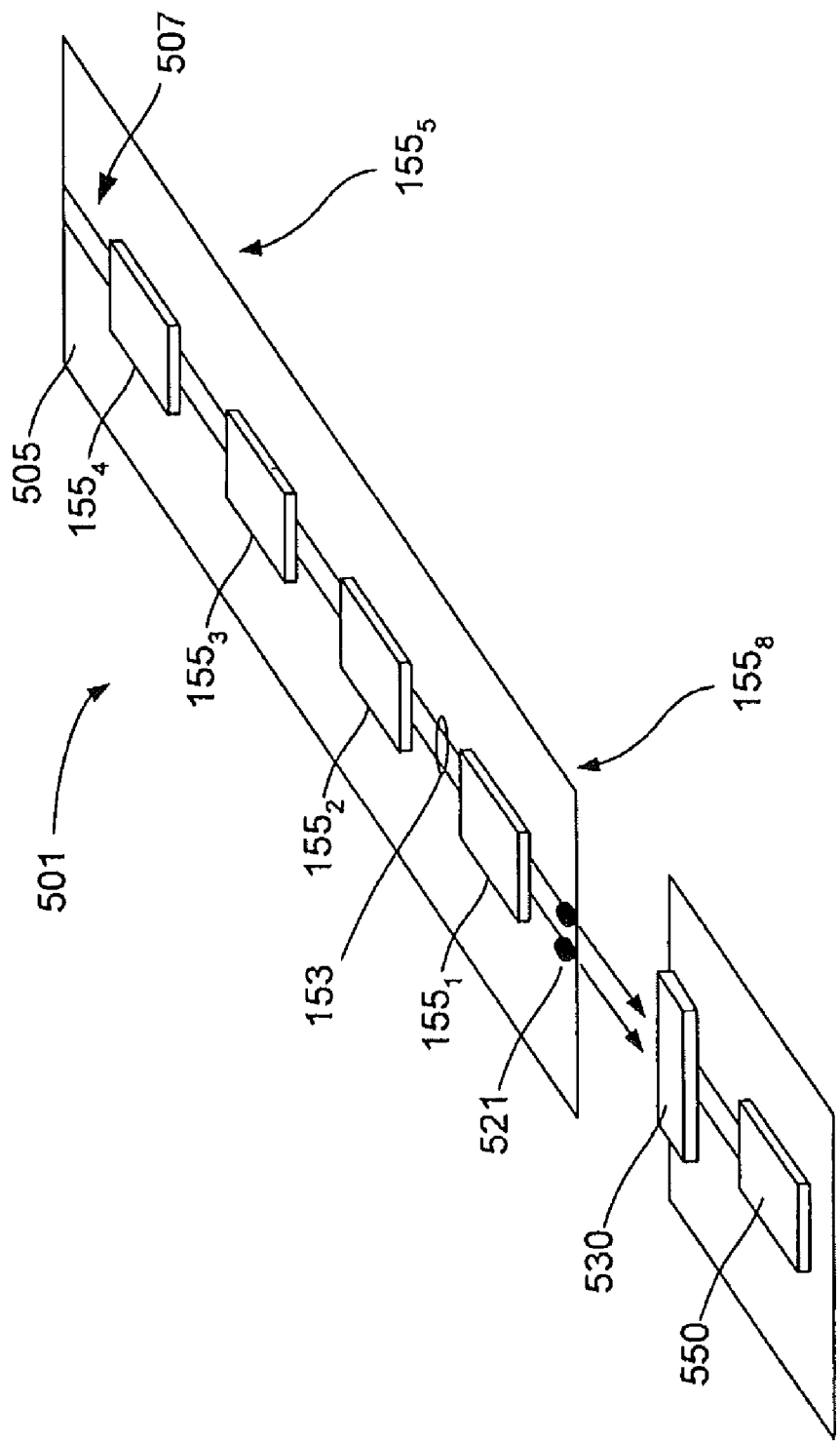
FIG. 23 is a perspective view of a memory module 501 having memory devices 155 disposed thereon and coupled to one another in a chain according to an embodiment of the invention.

FIG. 23 is a perspective view of a memory module 501 having memory devices 1551-1558 disposed thereon (more or fewer devices may be disposed on the memory module in alternative embodiments) and coupled to one another in a chain according to an embodiment of the invention. The memory module 501 includes a substrate 505 (e.g., glass, ceramic, fiberglass or other non-conductive material) to which the memory devices 155 are mounted and on which the interconnecting point-to-point links 153 are formed. In one embodiment, each point-to-point link 153 is formed by extremely short printed traces that extend across the surface of the substrate 505 (or a submerged layer of the substrate) from an output side of one memory device 155 to the input-side of the downstream memory device 155. The memory devices 155 may be disposed on both sides of the substrate 505 with turnaround traces 507 extending over the end of the substrate and turning back to couple the last memory device on one side of the substrate 505 to the first memory device on the second side of the substrate (e.g., in the context of FIG. 5A, joining memory device 1554 to memory device 1555). Alternatively, the turnaround traces 507 may extend through the substrate 505 (or be coupled to conductive vias that extend through the substrate 505) to join the opposite-side memory devices 155.

Still referring to FIG. 23, printed traces also extend from a first set of contacts 521 disposed at a first end of the memory module 501 to the initial memory device 1551 in the chain of memory devices, the contacts 521 enabling removable connection (i.e., via connector 555) to counterpart contacts within a connector 530 coupled to a memory controller 550. A second set of contacts to enable removable connection of an input interface of the memory controller 550 to the final memory device 1558 in the chain is disposed at the first end of the memory module on a side opposite the set of contacts 521.

As discussed above in reference to FIGS. 4A-4E, numerous memory chains may be coupled to a given memory controller (e.g., by providing additional connection interfaces). Each such memory chain may be formed on a separate substrate, or a single substrate may include multiple memory chains disposed side by side. Also, while printed traces are depicted and described as forming the point-to-point signaling links in FIG. 23, other signaling structures may be used in alternative embodiments as discussed above.

Section headings have been provided in this detailed description for convenience of reference only, and in no way define, limit, construe or describe the scope or extent of such sections. Also, while the invention has been described with reference to specific embodiments thereof, it will be evident that various modifications and changes may be made thereto without departing from the broader spirit and scope of the invention. Accordingly, the specification and drawings are to be regarded in an illustrative rather than a restrictive sense.

What is claimed is:

1. A memory device having data inputs and data outputs configured to be coupled to memory devices in a chain, comprising:
a controller circuit configured to receive command packets including device selectors configured to identify selected ones of the memory devices in the chain to which data is transmitted from a memory controller, and configured to re-transmit data received from the memory controller to selected ones of the memory devices based on the device selectors.

2. A method of operating a memory system including a plurality of memory devices having respective data inputs coupled one to another in a chain, the method comprising:
transmitting a command packet from a memory controller to the plurality of memory devices, the command packet including device selectors configured to identify selected ones of the plurality of memory devices in the chain to which data is transmitted from the memory controller;
receiving the command packet at the ones of the plurality of memory devices to configure the selected ones of the plurality of memory devices for re-transmission of data received from the memory controller;
receiving the data transmitted from the memory controller at a first of the selected ones of the plurality of memory devices identified by the device selectors to provide received data; and
re-transmitting at least some of the received data to a next one of the selected ones of the plurality of memory devices identified by the device selectors.

3. The method according to claim 2 wherein re-transmitting at least some of the received data to a next one of the selected ones of the plurality of memory devices identified by the device selectors comprises re-transmitting all of the received data to the next one of the selected ones of the plurality of memory devices identified by the device selectors.

4. The method according to claim 3 wherein re-transmitting all of the received data further comprises:
asserting a valid out signal from the first of the selected ones of the plurality of memory devices to the next one of the selected ones of the plurality of memory devices identified by the device selectors during a time when the re-transmitting occurs.

5. The method according to claim 2 wherein re-transmitting at least some of the received data to a next one of the selected ones of the plurality of memory devices identified by the device selectors comprises re-transmitting to the next one only that data received by the first of the selected ones of the plurality of memory devices but not identified for storage therein by the device selectors.

6. The method according to claim 5 wherein re-transmitting all of the received data further comprises:
asserting a valid out signal from the first of the selected ones of the plurality of memory devices to the next one of the selected ones of the plurality of memory devices identified by the device selectors during a time when the re-transmitting occurs.

7. The method according to claim 6 wherein re-transmitting all of the received data further comprises:
asserting the valid out signal only during a time that data received by the first of the selected ones of the plurality of memory devices is re-transmitted.

8. A method of operating a memory system including a plurality of memory devices having respective data inputs coupled one to another in a chain, the method comprising:
transmitting a command packet from a memory controller to the plurality of memory devices, the command packet including device selectors configured to identify selected ones of the plurality of memory devices in the chain to which data is transmitted from the memory controller;
receiving the command packet at the ones of the plurality of memory devices to configure the selected ones of the plurality of memory devices for re-transmission of data received from the memory controller;
receiving the data transmitted from the memory controller at a first of the selected ones of the plurality of memory devices identified by the device selectors to provide received data; and
re-transmitting all of the received data from the first of the selected ones of the plurality of memory devices to a next one of the selected ones of the plurality of memory devices identified by the device selectors.

* * * * *